(12) United States Patent
Ogle et al.

(10) Patent No.: US 7,125,460 B2
(45) Date of Patent: Oct. 24, 2006

(54) FIRE RESISTANT NONWOVEN BATT HAVING BOTH CHARRING AND OXYGEN-DEPLETING FIBERS

(75) Inventors: Steven E. Ogle, Murfreesboro, TN (US); D. Patrick Steagall, Mooresville, NC (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 10/968,339

(22) Filed: Oct. 18, 2004

(65) Prior Publication Data

US 2006/0040580 A1 Feb. 23, 2006

Related U.S. Application Data

(63) Continuation of application No. 10/221,638, filed as application No. PCT/US01/07831 on Mar. 13, 2001.

(60) Provisional application No. 60/542,263, filed on Feb. 3, 2004, provisional application No. 60/188,979, filed on Mar. 13, 2000.

(51) Int. Cl.
*B32B 27/36* (2006.01)
*D04H 1/42* (2006.01)

(52) U.S. Cl. .......... 156/62.2; 156/62.8; 264/112; 264/113; 442/327; 442/381; 442/389; 442/415

(58) Field of Classification Search .......... None
See application file for complete search history.

(56) References Cited

U.S. PATENT DOCUMENTS

| | | | |
|---|---|---|---|
| 4,863,797 A | 9/1989 | Ichibori et al. |
| 4,865,906 A | 9/1989 | Smith, Jr. |
| 4,879,168 A | 11/1989 | McCullough, Jr. et al. |
| 4,943,478 A | 7/1990 | McCullough, Jr. et al. |
| 4,950,533 A | 8/1990 | McCullough, Jr. et al. |
| 4,970,111 A | 11/1990 | Smith, Jr. |
| 5,188,896 A | 2/1993 | Suh et al. |
| 5,208,105 A | 5/1993 | Ichibori et al. |
| 5,275,875 A | 1/1994 | Suh et al. |
| 5,348,796 A | 9/1994 | Ichibori et al. |
| 5,503,915 A | 4/1996 | Ichibori et al. |
| 5,503,916 A | 4/1996 | Ichibori et al. |
| 5,506,042 A | 4/1996 | Ichibori et al. |
| 5,776,607 A | 7/1998 | McCullough |
| 5,837,626 A | 11/1998 | McCullough |
| 6,021,523 A | 2/2000 | Vero |
| 6,287,686 B1 | 9/2001 | Huang et al. |
| 6,358,608 B1 | 3/2002 | Hanyon et al. |
| 6,823,548 B1 | 11/2004 | Murphy et al. |
| 2004/0198125 A1 | 10/2004 | Mater et al. |

FOREIGN PATENT DOCUMENTS

WO WO 01/68341 A1 9/2001
WO WO 03/023108 A1 3/2003

*Primary Examiner*—Sam Chuan Yao
(74) *Attorney, Agent, or Firm*—Conley Rose, P.C.; Kristin Jordan Harkins

(57) ABSTRACT

Disclosed are uni-layer and bi-layer FR nonwoven fiber batts formed of various blends of charring fibers such as FR treated rayon, oxygen-depleting fibers such as modacrylic fibers and nonwoven fibers such as carrier fibers and binder fibers and associated methods for forming the same. Variously, the uni-layer and bi-layer FR nonwoven fiber batts may include layers formed entirely of blends of charring fibers and nonwoven fibers, layers formed entirely of blends of oxygen-depleting fibers and nonwoven fibers and/or layers formed of blends of charring fibers, oxygen-depleting fibers and nonwoven fibers.

25 Claims, 13 Drawing Sheets

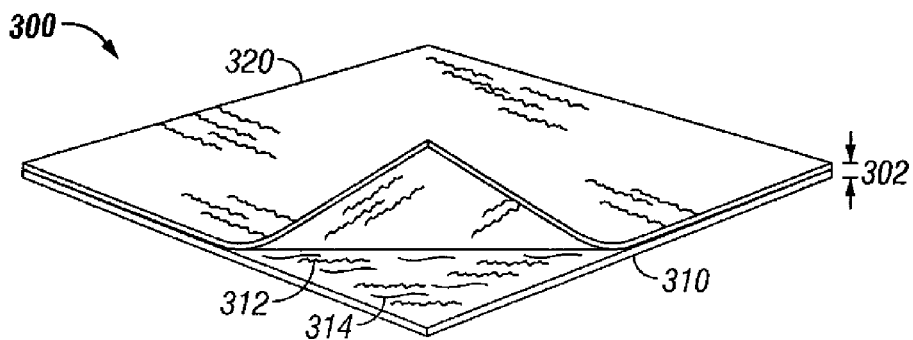
FIG. 7
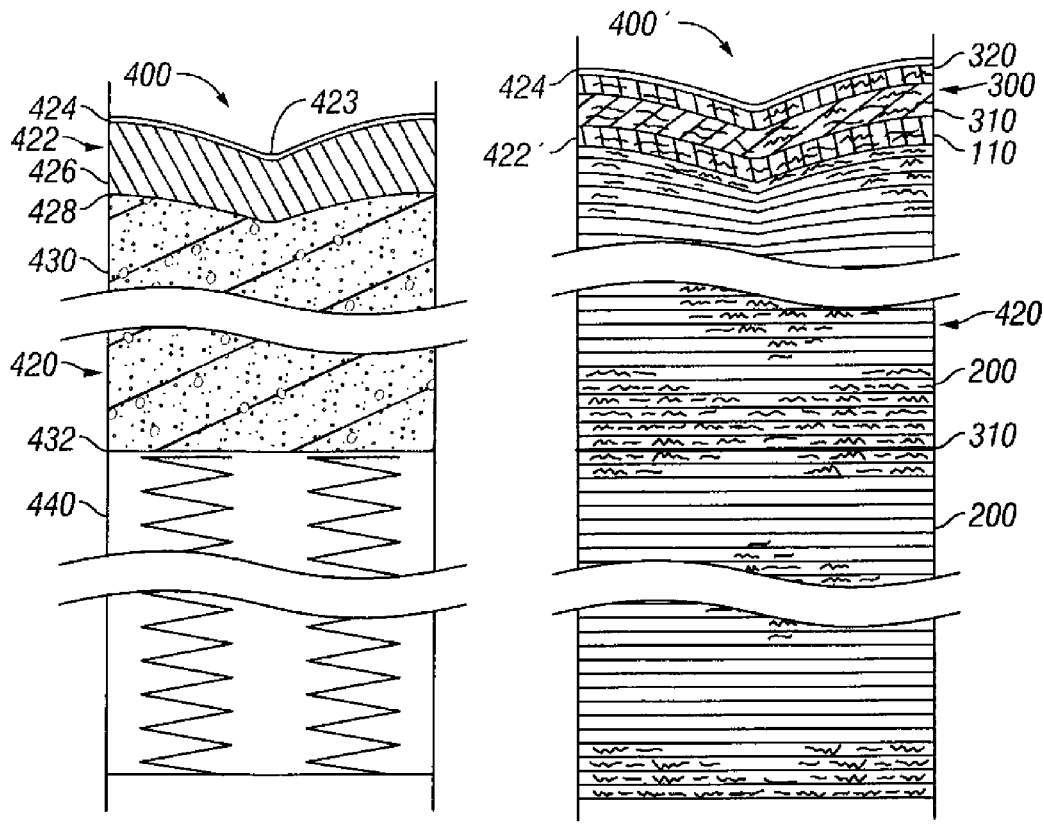
FIG. 8A
FIG. 8B

FIRE RESISTANT NONWOVEN BATT HAVING BOTH CHARRING AND OXYGEN-DEPLETING FIBERS

CROSS-REFERENCE TO RELATED APPLICATIONS

This application is related to U.S. Provisional Patent Application Ser. No. 60/542,263 filed Feb. 3, 2004 and is a CIP of Ser. No. 10/221,638 Jan. 7, 2003, which is a 371 of PCT/US01/07831 Mar. 13, 2001, which claims benefit of 60/188,979 Mar. 13, 2000.

This application is related to U.S. Nonprovisional patent application Ser. No. 10/968,318 filed Oct. 18, 2004. This application is also a Continuation-In-Part of (C-I-P) of U.S. Nonprovisional patent application Ser. No. 10/221,631 filed Sep. 13, 2002 which is based upon International Patent Application PCT/US01/078341 filed Sep. 13, 2001 which claimed priority U.S. Provisional Patent Application 60/188,979 filed Mar. 13, 2000. All of the above-listed related applications are assigned to the Assignee of the present application and are hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

The present disclosure relates to fire resistant (FR) nonwoven batts and, more particularly, to uni-layer and bi-layer FR nonwoven batts which combine plural types of fibers, each having a distinct flame response characteristic. The disclosed FR nonwoven batt is useful in a variety of applications, including, but not limited to applications as a fire barrier layer and as filling in bedding, upholstery and vehicle and aircraft seats, as insulators for apparel, appliances, walls, vehicle walls and ducting, as barriers to separate control systems from a heat source, and as components in fire safety gear, and the like.

BACKGROUND

Fire retardant barriers are desirable for a wide variety of applications. Products for household and public occupancies such as health care facilities, convalescent care homes, college dormitories, residence halls, hotels, motels and correctional institutions are sometimes governed by regulations which require certain FR characteristics, particularly in bedding and upholstery. Fire barrier components are also needed in apparel, fire safety gear, vehicle and aircraft seating and walls, as insulators for appliances, walls, ducting, as barriers to separate sensitive controls from a heat source and other similar applications where fire safety is a concern. Effective fire barriers minimize the amount and rate of heat released from the barrier upon contact with fire. The rate of heat released is an indication of the intensity of the fire generated from the fire barrier material as well as how quickly the fire spreads. Slowing the spread of fire advantageously increases the amount of response time for a fire victim to safely escape and a fire department to successfully extinguish the fire.

In the bedding, upholstery and other industries, foams and nonwoven fibers are used in mattresses, sofas, chairs, and seat cushions, backs and arms. Traditionally, urethane foam has been combined with other types of cushioning materials such as cotton batting, latex rubber, and various nonwoven fibers in order to impart desirable comfort, loft and durability characteristics to a finished product. However, urethane foam is extremely flammable and must be chemically treated or coated to impart fire resistant properties thereto. As it is relatively fire resistant, neoprene foam is often used in bedding and upholstery products as well. However, as both neoprene foam and urethane foam which has been chemically treated to impart fire resistant properties thereto are relatively expensive, cost constraints may limit the applications for which neoprene foam and chemically treated urethane are commercially suitable.

Synthetic and natural nonwoven fibers have also demonstrated usefulness in the construction of mattresses and upholstery. Such fibers are inherently lightweight and therefore easy to ship, store and manipulate during processing. Rather than burning when subjected to open flame, many synthetic fibers, particularly polymer fibers and, more specifically, dry polyester fibers, tend to melt and drip. Furthermore, polymer fibers can be coated in a manner which enhances their tendency to resist burning. For example, polymer fibers which have been sufficiently treated such that they are considered to be non-flammable include Trevira CS, Kevlar® and Nomex®. Trevira CS is manufactured by Trevira Gmbh of Hatttersheim, Germany while both Kevlar® and Nomex® are manufactured by E.I. du Pont de Nemours and Company of Wilmington, Del.

Another fire resistant fiber is known as oxidized polyacrylonitrile ("PAN"). While fire resistant, however, oxidized PAN fibers are difficult to process into batts for use as a barrier layer and/or filling, particularly in bedding and upholstery applications. The oxidized PAN fibers are relatively low in weight and specific gravity, thereby making traditional carding methods used to form batts difficult. In addition, oxidized PAN fibers are often referred to as "dead" fibers because of their lack of resilience, loft and compressibility. As a result, oxidized PAN fibers are often unsuitable for use in applications, for example, bedding and upholstery applications, where comfort and loft are desired. Finally, because they are black in color, oxidized PAN fibers may be unsuitable in applications which require lighter colors underneath a light decorative upholstery or mattress layer.

International Publication No. WO 01/6834 A1, filed by the Assignee of the present application and previously incorporated by reference as if reproduced in its entirety, discloses a method of forming a fire combustion modified batt having a first, FR, layer formed from a blend of nonwoven and oxidized PAN fibers and a second layer formed from nonwoven fibers. The resultant batt has a distinctly gray colored side (the oxidized PAN layer) and a distinctly white side (the nonwoven fiber layer). The oxidized PAN layer acts as a flame barrier for the fire combustion modified batt while the nonwoven fiber layer acts as a sacrificial aesthetic layer which provides the fire combustion modified batt with a white surface. International Publication No. WO 03/023108 A1 discloses a nonwoven highloft flame barrier comprised of a blend of fibers which includes inherently flame retardant fibers, preferably, melamine fibers, either alone or in combination with other inherently flame retardant fibers, fibers capable of generating oxygen depleting gases, and low melt binder fibers.

What is sought are uni-layer and bi-layer fire FR nonwoven batts configured such that the use of various combinations of charring fibers characterized by a first flame response characteristic and oxygen-depleting fibers characterized by a second flame response characteristic combine to enhance the overall FR characteristic of the resultant FR nonwoven batt.

SUMMARY OF THE INVENTION

In one embodiment, the present invention is directed to a bi-layered FR nonwoven fiber batt and an associated method for forming the same. In accordance with this embodiment, a first, barrier, web is formed from a first fiber blend, a second, oxygen-depleting, web is formed from a second fiber blend and a first surface of the first, barrier, web is contacted with a second surface of the second, oxygen-depleting, barrier web to form the bi-layered FR nonwoven fiber batt. In various aspects thereof, the first fiber blend may be comprised of: (a) between about five and about ninety-five percent, by volume, of charring fibers; (b) a blend of charring fibers and nonwoven fibers; (c) a blend of charring fibers, carrier fibers and binder fibers; or (d) a blend of about seventy-five percent, by volume, of charring fibers, about ten percent, by volume, of carrier fibers and fifteen percent, by volume, of binder fibers. In another, the charring fibers may be FR treated rayon fibers.

In various other aspects of this embodiment of the invention, the second fiber blend may be comprised of: (a) between about five and about ninety five percent, by volume, of oxygen-depleting fibers; (b) a blend of oxygen-depleting fibers and nonwoven fibers; (c) a blend of oxygen-depleting fibers, carrier fibers and binder fibers; or (d) a blend of about forty-five percent, by volume, of oxygen-depleting fibers, about forty percent, by volume, of carrier fibers and about fifteen percent, by volume, of binder fibers. In another, the oxygen-depleting fibers may be modacrylic fibers.

In still other aspects of this embodiment of the invention, the first and second fiber blends may respectively be comprised of: (a) between about five and about ninety-five percent, by volume, of charring fibers and between about five and about ninety-five percent, by volume, of oxygen-depleting fibers; (b) a blend of charring fibers and nonwoven fibers and a blend of oxygen-depleting fibers and nonwoven fibers; (c) a blend of charring fibers, carrier fibers and binder fibers and a blend of oxygen-depleting fibers, carrier fibers and binder fibers; or (d) a blend of about seventy-five percent, by volume, of charring fibers, about ten percent, by volume, of carrier fibers and about fifteen percent, by volume, of binder fibers and a blend of about forty-five percent, by volume, of oxygen-depleting fibers, about forty percent, by volume, of carrier fibers and about fifteen percent, by volume, of binder fibers. In another, the charring fibers of the first, barrier, web may be FR treated rayon fibers and the oxygen-depleting fibers of the second, oxygen-depleting, web may be modacrylic fibers.

In another embodiment, the present invention is directed to a bi-layered FR nonwoven fiber batt and an associated method for forming the same. A first nonwoven fiber batt is formed from a first fiber blend at least partially comprised of charring fibers and a second nonwoven fiber batt is formed from a second fiber blend at least partially comprised of oxygen-depleting fibers. The first and second nonwoven fiber batts are then oriented relative to one another such that the second nonwoven fiber batt forms an inner layer of the bi-layered FR nonwoven fiber batt while the first nonwoven fiber batt forms an outer layer of the bi-layered FR nonwoven fiber batt. Upon application of flame and/or heat to the bi-layered FR nonwoven fiber batt, the inner layer of the bi-layered FR nonwoven fiber batt generates oxygen-depleting gases while the outer layer of the bi-layered FR nonwoven fiber batt chars but maintains sufficient structural integrity to trap the oxygen depleting gases, generated by the inner layer of the bi-layer FR nonwoven fiber batt, between the inner and outer layers of the bi-layered FR nonwoven fiber batt.

In various aspects of this embodiment of the invention, the first fiber blend may be comprised of: (a) between about five and about ninety-five percent, by volume, of charring fibers; (b) a blend of charring fibers and nonwoven fibers; (c) a blend of charring fibers, carrier fibers and binder fibers; or (d) a blend of about seventy-five percent, by volume, of charring fibers, about ten percent, by volume, of carrier fibers and about fifteen percent, by volume, of binder fibers. In another, the charring fibers may be FR treated rayon fibers.

In various other aspects of this embodiment of the invention, the second fiber blend may be comprised of: (a) between about five and about ninety five percent, by volume, of oxygen-depleting fibers; (b) a blend of oxygen-depleting fibers and nonwoven fibers; (c) a blend of oxygen-depleting fibers, carrier fibers and binder fibers; or (d) a blend of about forty-five percent, by volume, of oxygen-depleting fibers, about forty percent, by volume, of carrier fibers and about fifteen percent, by volume, of binder fibers. In another, the oxygen-depleting fibers may be modacrylic fibers.

In still other aspects of this embodiment of the invention, the first and second fiber blends may respectively be comprised of: (a) between five and ninety-five percent, by volume, of charring fibers and between about five and ninety-five percent, by volume, of oxygen-depleting fibers; (b) a blend of charring fibers and nonwoven fibers and a blend of oxygen-depleting fibers and nonwoven fibers; (c) a blend of charring fibers, carrier fibers and binder fibers and a blend of oxygen-depleting fibers, carrier fibers and nonwoven fibers; or (d) a blend of about seventy-five percent, by volume, of charring fibers, about ten percent, by volume, of carrier fibers and about fifteen percent, by volume, of binder fibers and a blend of about forty-five percent, by volume, of oxygen-depleting fibers, about forty percent, by volume, of carrier fibers and about fifteen percent, by volume, of binder fibers. In still another aspect thereof, the charring fibers of the first fiber blend may be FR treated rayon fibers and the oxygen-depleting fibers of the second fiber blend may be modacrylic fibers.

In another aspect of this embodiment of the invention, the first nonwoven fiber batt is formed from a first blend of charring fibers, oxygen-depleting fibers and nonwoven fibers and the second nonwoven fiber batt is formed from a second blend of charring fibers, oxygen-depleting fibers and nonwoven fibers. Preferably, the first blend would have a greater percentage, by volume, of charring fibers than percentage, by volume, of oxygen-depleting fibers while the second blend would have a greater percentage, by volume, of oxygen-depleting fibers than percentage, by volume, of charring fibers. Variously, the first fiber blend may be a blend of charring fibers, oxygen-depleting fibers, carrier fibers and binder fibers while the second fiber blend may be a blend of charring fibers, oxygen-depleting fibers, carrier fibers and nonwoven fibers. The charring and oxygen-depleting fibers of the first and second nonwoven fiber batts may each be formed of FR treated rayon fibers and modacrylic fibers, respectively.

In still another embodiment, the present invention is directed to a uni-layer FR nonwoven fiber batt formed from a blend of charring fibers, oxygen-depleting fibers and binder fibers and an associated method of forming the same. In various aspects of this embodiment of the invention, the blend may be comprised of: (a) at least about fifty percent, by volume, of charring fibers, at least about ten percent, by volume, of oxygen-depleting fibers and at least about twelve percent, by volume, of binder fibers; (b) between about fifty percent and about seventy-eight percent, by volume, of charring fibers, between about ten percent and about thirty-eight percent, by volume, of oxygen-depleting fibers and between about twelve percent and about forty percent, by volume, of binder fibers; or (c) about sixty percent, by volume, of charring fibers, about twenty percent, by volume, of oxygen-depleting fibers and about twenty percent, by volume, of binder fibers. In another aspect thereof, the charring fibers may be FR treated rayon fibers and the oxygen-depleting fibers may be modacrylic fibers.

In still another embodiment, the present invention is directed to a method for forming a uni-layer fire resistant ("FR") nonwoven fiber batt by first forming a blend comprised of a first amount of charring fibers, a second amount of oxygen-depleting fibers and a third amount of binder fibers and subsequently forming the uni-layer FR nonwoven fiber batt from the blend. In accordance with this embodiment of the invention, the first, second and third amounts are selected based upon a desired basis weight for the uni-layer FR nonwoven fiber batt, a desired percentage, by volume, of charring fibers in the blend, a desired percentage, by volume, of oxygen-depleting fibers in the blend and a desired percentage, by volume, of binder fibers in the blend. In one aspect of this embodiment of the invention, the charring fibers may be FR treated rayon fibers and the oxygen-depleting fibers may be modacrylic fibers.

DESCRIPTION OF THE DRAWINGS

For a more complete understanding of the present invention, and for further details and advantages thereof, reference is now made to the accompanying drawings, in which:

FIG. 7 is a perspective top view of a bi-layer FR nonwoven fiber batt, formed in accordance with the method of either FIG. 1 or FIG. 6 and comprised of a first, barrier, layer and a second, sacrificial, layer.

FIG. 8A is a side cut away view of a traditional mattress.

FIG. 8B is a side cut away view of a mattress which incorporates the uni-layer FR nonwoven fiber batt of FIG. 5.

NOTATION AND NOMENCLATURE

Figure 1:
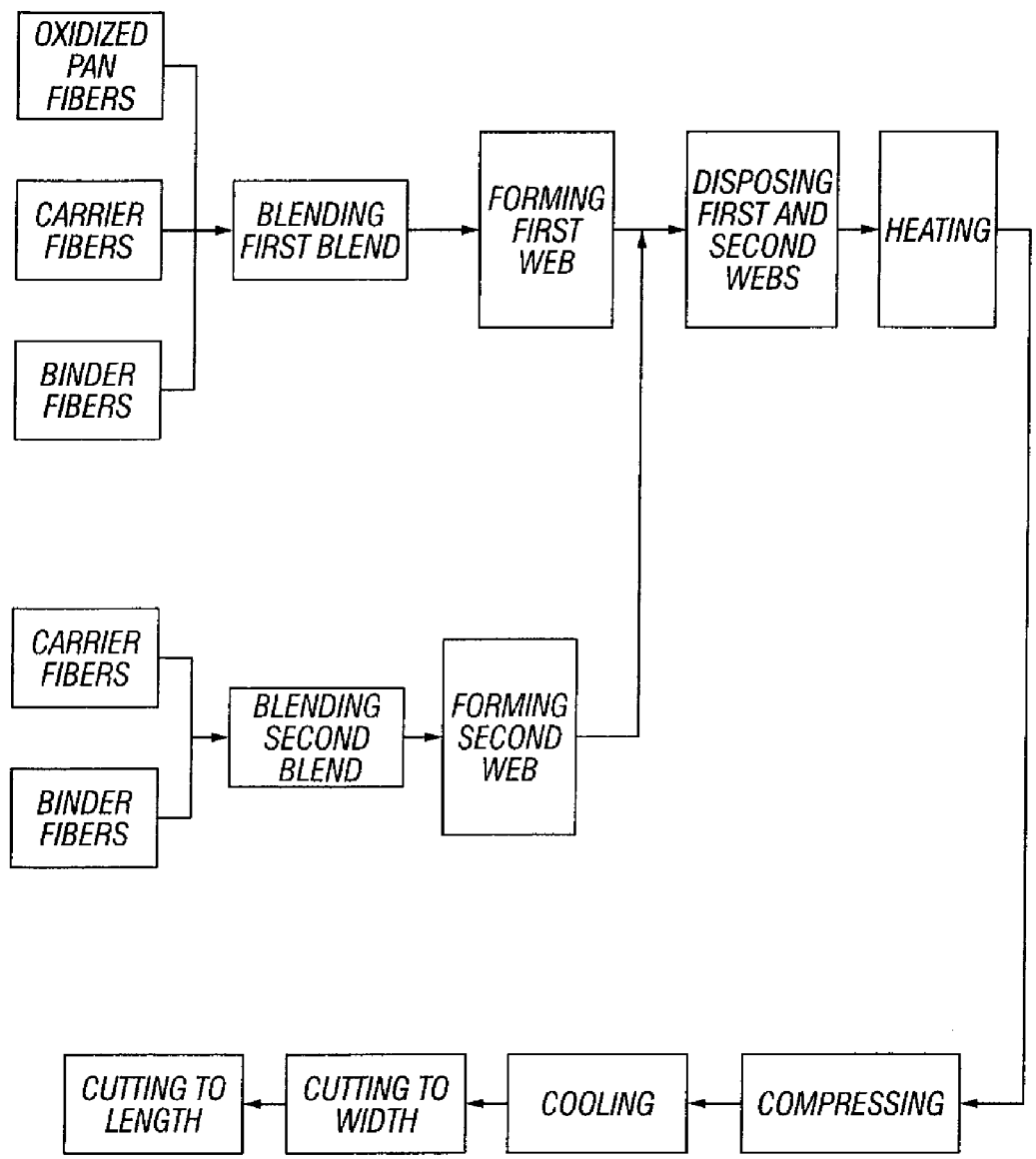
FIG. 1 is a schematic flow chart of a method of forming either a uni-layer FR nonwoven fiber batt comprised of a single, barrier, layer formed using charring fibers or a bi-layer FR nonwoven fiber batt comprised of a first, barrier, layer formed using charring fibers and a second, sacrificial, layer.

Certain terms are used throughout the following description and claims to refer to particular components thereof. This document does not intend to distinguish between components that differ in name but not in function.

In the detailed description and claims which follow, the terms "including" and "comprising" are used in an open-ended function, and thus should be interpreted to mean "including, but not limited to . . . ".

The term "basis weight" of a nonwoven fiber batt generally refers to the weight (in ounces) of a square foot of the nonwoven fiber batt.

The term "charring fibers" generally refers to inherently FR fibers which carbonize into a charred fiber but will maintain a stable physical structure when exposed to flame.

The term "compact nonwoven fiber batt" generally refers to a nonwoven fiber batt having a height (in inches) between about two-thirds and one times its basis weight (in ounces). For example, a nonwoven fiber batt having a basis weight of about one ounce per square foot and a height of between about two-thirds of an inch and about one inch would be a compact nonwoven fiber batt.

The term "densified nonwoven fiber batt" generally refers to a nonwoven fiber batt having a height (in inches) less than about two-thirds of its basis weight (in ounces). For example, a nonwoven fiber batt having a basis weight of about one ounce and a height of less than about two-thirds of an inch would be a densified nonwoven fiber batt.

The term "FR treated cotton" generally refers to cotton fibers to which a suitable flame retardant chemical is applied, thereby rendering the cotton fibers inherently flame resistant.

The term "FR treated rayon" generally refers to rayon fibers to which a suitable flame retardant chemical is applied, thereby rendering the rayon fibers inherently flame resistant.

The term "high loft nonwoven fiber batt" generally refers to a nonwoven fiber batt having a height (in inches) greater than its basis weight (in ounces). For example, a nonwoven fiber batt having a basis weight of about one ounce and a height of more than about one inch would be a high loft nonwoven fiber batt.

The term "melting" shall also refer to the gradual transformation of a fiber or, in the case of a bicomponent sheath/core fiber, the sheath of the fiber, over a range of temperatures within which the fiber becomes sufficiently soft and tacky to cling to other fibers with which it comes in contact.

The term "oxygen-depleting fiber" generally refers to those fibers which generate oxygen-depleting gases when exposed to flame. The term may also refer to those fibers which, in addition to generating oxygen depleting gases when exposed to flame, are also inherently fire resistant and will maintain a stable physical structure when exposed to flame.

DETAILED DESCRIPTION

It should be clearly understood that the present invention is susceptible to various modifications and alternative forms, specific embodiments of which are, by way of example, shown in the drawings and described in detail herein. It should be clearly understood, however, that the drawings and detailed description set forth herein are not intended to limit the invention to the particular form disclosed. On the contrary, the intention is to cover all modifications, equivalents and alternatives falling within the spirit and scope of the present invention as defined by the claims appended hereto.

The method for forming a fire combustion modified batt, hereafter referred to as an FR nonwoven fiber batt, which we disclosed in our co-pending Nonprovisional U.S. patent application Ser. No. 10/968,318 filed Oct. 18, 2004 and in our co-pending Nonprovisional U.S. patent application Ser. No. 10/221,631 filed Sep. 13, 2002, both of which are assigned to the Assignee of the present application, were previously incorporated by reference into the present application as if reproduced in their entirety and on both of which the present application claims priority, will now be described in greater detail. More specifically, disclosed therein were processes for bonding web fibers together to form a FR nonwoven fiber batt. The bonding processes discussed therein in connection with the formation of the FR nonwoven fiber batt included a thermal bonding process and a resin saturated curing process. However, other methods, for example, needle-punching, hydro-entangling and mechanical bonding, may be suitable for bonding web fibers together to form the FR nonwoven fiber batt.

Referring now to FIG. 1, the thermal bonding process used to form an FR nonwoven fiber batt is representatively and schematically illustrated. As may now be seen, the process of forming an FR nonwoven fiber batt comprised blending nonwoven fibers and charring fibers such as oxidized polyacrylonitrile (PAN) fibers to form a first web blend. For purposes of illustrating the process and not by way of limitation, the charring fibers of the present invention may be oxidized PAN fibers, such as those marketed under the product name Pyron® by Zoltek Companies, Inc. of St. Louis, Mo. As is well known in the art, oxidized PAN fibers are produced from an acrylic precursor. For example, Pyron® oxidized PAN fibers are a stabilized form of PAN fibers produced from an oxidation process that converts the PAN fiber from a thermoplastic state to a thermoset state.

The discussion set forth below illustrates generally the method for forming, and the composition of, a particular type of charring fibers, specifically, oxidized PAN fibers. However, the foregoing discussion of one particular type of charring fiber should not be seen as a limitation on the scope of the invention. Accordingly, it is fully contemplated that other methods and compositions may be suitable for the purposes contemplated herein. More specifically, it is noted that several types of acrylic polymers with variations in their composition have been used for the production of oxidized PAN fibers. It is further noted that the exact composition of a particular acrylic precursor tends to vary widely. Generally, however, the composition of an acrylic precursor contains a minimum of 85% acrylonitrile and a maximum of 15%, but preferably no more than 8%, comonomers such as methyl methacrylate, methyl acrylate, vinyl acetate, vinyl chloride, and other monovinyl compounds.

In addition to acrylic as a precursor for the production of carbon fibers, rayon and pitches are also used. In this regard, it is noted that, although their essential features are similar, the details of the conversion processes used for different precursors are not the same. Generally, such processes typically involve a stabilizing treatment to prevent melting or fusion of the fiber, a carbonizing treatment to eliminate the non-carbon elements and a high temperature graphitizing treatment to enhance the mechanical properties of the final carbon fiber.

In the case of PAN fibers, stabilization is carried out by controlled heating of the precursor fiber in an oxidizing atmosphere, for example, in air in a temperature range which extends from about 180° C. to about 300° C. The heating rate is usually 1–2° C./minute. However, other temperature ranges and/or heating rates may be appropriate. Shrinkage can be minimized by stretching the fibers along their axis during the low-temperature stabilization treatment. Stretching also produces oxidized PAN fibers with a high degree of preferred orientation along the fiber axis. The stabilization process produces changes in chemical structure of the acrylic precursor such that the product becomes thermally stable to subsequent high temperature treatments. During this process, the fibers change in color to black. The black fibers are carbonized in an inert atmosphere at high temperatures, for example, from about 1000° C. to about 1500° C. with a slow heating rate to avoid damage to the molecular order of the fiber. The fibers are given a graphitizing treatment at high temperatures for example, above 2000° C. to 3000° C., to improve the texture of the fiber and to enhance the Young's modulus. The strength and the modulus of the fibers can also be improved by hot stretching.

Generally, the physical characteristics of oxidized PAN fibers are its black color, a moisture content of about 4 to 9 percent, an average fiber diameter of about 11 to 14 microns, a fiber tensile strength of about 180 to 300 Mpa, a fiber elongation of about 18 to 28 percent, a fiber density of about 1.36 to 1.38 g/cc and a fiber length of about 4 to 15 cm. In addition, in the case of Pyron®, the oxidized PAN fibers are thermally stable up to 600° F. Of course, the physical and chemical properties of oxidized PAN fibers may vary depending on the particular process used to manufacture oxidized PAN.

As may be seen in FIG. 1, the nonwoven fibers forming part of the first blend include carrier fibers and binder fibers. Various, these fibers can be natural or synthetic. For example, thermoplastic polymer fibers such as polyester are synthetic fibers suitable for use as the carrier and binder fibers. Of course, depending on the precise processing limitations imposed on the manufacturing process and the characteristics of the batt which are desired at the end of the process, other fibers may be suitable for the purposes contemplated herein. For example, in the embodiment disclosed herein, the carrier fiber is a Type 209 polyester fiber manufactured by KoSa of Wichita, Kans. The Type 209 polyester fiber has a weight-per-unit-length of between 6 and 15 denier, a cut length of between 2 and 3 inches in length and a round, hollow, cross-section. Alternately, the carrier fiber may be a Type 295 polyester fiber, also manufactured by KoSa. The Type 295 polyester fiber has a weight-per-unit-length of between 6 and 15 denier, a cut length of between 1/5 and 4 and a pentalobal cross-section. Of course, the foregoing disclosure of particular carrier fibers is purely for purposes of illustration and should not be construed as a limitation in any manner. In this regard, it is fully contemplated that other nonwoven fibers are suitable for use as carrier fibers and are, therefore, within the scope of the present invention.

The binder fiber has a lower predetermined melting temperature relative to the predetermined melting temperature of the carrier fiber. It is an inherent characteristic of thermoplastic fibers such as polyester that they become sticky and tacky when melted, as that term is used herein. For purposes of illustrating the process by which an FR nonwoven fiber batt is constructed, in the embodiment disclosed herein, it is contemplated that the binder fiber may be a Type 254 Celbond® polyester fiber, also manufactured by KoSa. The Type 254 Celbond® polyester fiber is a bicomponent fiber with a polyester core and a copolyester sheath having a melting temperature of approximately 230° F. (110° C.). Of course, the foregoing disclosure of a particular binder fiber is purely for purposes of illustration and should not be construed as a limitation in any manner. In this regard, it is fully contemplated that other nonwoven fibers are suitable for use as binder fibers and are, therefore, within the scope of the present invention. For example, it is contemplated that a polyester copolymer binder fiber is suitable for use in place of the bicomponent binder fiber hereinabove disclosed.

While the homogeneous mixture of nonwoven fibers and charring fibers such as oxidized PAN fibers can be any of a number of suitable fiber blends, for purposes of illustrating the process of forming an FR nonwoven fiber batt and the first blend of fibers used to form the FR nonwoven fiber batt, it is contemplated that the first blend may be comprised of binder finders in an amount sufficient for binding the fibers of the first blend together upon application of heat at the appropriate temperature to melt the binder fibers. In one example, the binder fibers are in the range of approximately 5 percent to 50 percent by total volume of the blend. Preferably, the binder finders are present in the range of approximately 10 percent to 15 percent by volume for a high loft nonwoven FR fiber batt and in the range of approximately 15 percent to 40 percent by volume for a densified nonwoven FR fiber batt. The relative percent volume of charring fibers to carrier fibers in the remaining volume of the first blend may range from 15 percent to 85 percent. In the preferred embodiment, the relative percent volume of charring fibers to carrier fibers in the remaining volume of the first blend is about 50 percent to 50 percent. Thus, for example, a blend having 10 percent by volume of binder fibers and a 50 to 50 percent relative volume of charring fibers to carrier fibers in the remaining volume of the blend, the volume of charring fibers and carrier fibers in the blend is 45 percent each. In another example, for a blend having 20 percent by volume of binder fibers and a 50 to 50 percent relative volume of charring fibers to carrier fibers in the remaining volume of the blend, the volume of charring fibers and carrier fibers is 40 percent each. In still another example, for a blend having 20 percent by volume of binder fibers and a 75 to 25 percent relative volume of charring fibers to carrier fibers in the remaining volume of the blend, the volume of charring fibers and carrier fibers in the blend is 60 percent and 20 percent, respectively. Of course, it is fully contemplated that blends having other percentages of binder, carrier and charring fibers are also within the scope of the invention. It is further contemplated that first blend need not necessarily include each of the aforementioned finder, carrier and charring fibers. For example, in some instances, it may be suitable to form the first blend of fibers without the inclusion of carrier fibers therein.

Referring back to FIG. 1, the method further comprises an optional step of blending a homogenous second blend of carrier and binder fibers to form a second web. The fibers can be the same as or similar to those of the first web discussed herein, such as, for example, polyester fibers. Other synthetic or natural fibers can be used depending upon the precise processing limitations imposed and the characteristics of the second web which are desired at the end of the process. While the homogeneous mixture of carrier and binder fibers can be any of a number of suitable fiber blends, for purposes of illustrating the process and second blend, the second fiber blend is comprised of between about 10 percent and about 15 percent by volume of binder fibers and between about 90 percent and about 85 percent by volume of carrier fibers.

Figure 2:
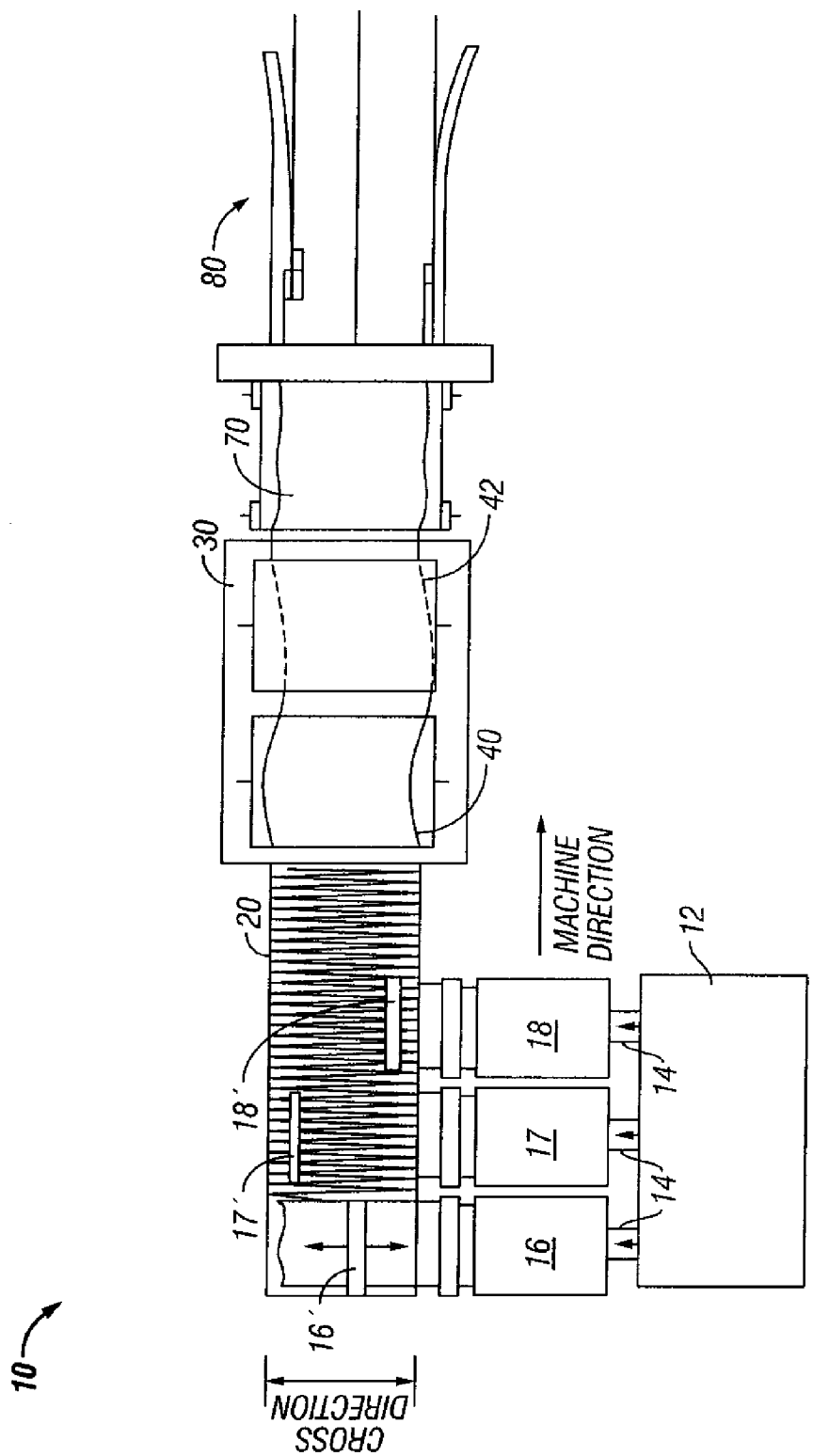
FIG. 2 is a schematic top plan view of a processing line for forming either a uni-layer FR nonwoven fiber having a single, barrier, layer or a bi-layer FR nonwoven fiber batt having a first, barrier layer and a second, sacrificial, layer.

Referring next to FIG. 2, a schematic top plan view of a processing line 10 for forming a uni-layer FR nonwoven fiber batt having either a single, barrier, layer or a bi-layer FR nonwoven fiber batt having a first, barrier layer in combination with a second, sacrificial, layer will now be described in greater detail. It should be noted, however, that the description which follows is directed to the formation of a web in general and thus is applicable to forming both a first web comprising charring fibers such as oxidized PAN fibers and nonwoven fibers and a second web of nonwoven fibers. As hereinabove discussed above, fibers are blended in a fiber blender 12 and conveyed by conveyor pipes 14 to a web forming device or, in this example, three web forming devices 16, 17, 18. A suitable web forming device is a garnett machine. An air laying device, commonly known in the art as a Rando webber, or any other suitable device may also be used to form a web structure. The garnett machines 16, 17, 18 card the blended fibers into a nonwoven web having a desired width and deliver the nonwoven web to cross-lappers 16', 17', 18' to cross-lap the nonwoven web onto a slat conveyor 20 which is moving in the machine direction. Cross-lappers 16', 17' 18' reciprocate back and forth in the cross direction from one side of conveyor 20 to the other side to form a nonwoven web having multiple thicknesses in a progressive overlapping relationship.

The number of layers which make up the nonwoven web is determined by the speed of the conveyor 20 in relation to the speed at which successive layers of the nonwoven web are layered on top of each other and the number of cross-lappers 16', 17', 18'. Thus, the number of single layers which collectively make up the nonwoven web can be increased by slowing the relative speed of the conveyor 20 in relation to the speed at which the cross-lappers 16', 17', 18' reciprocate, by increasing the number of cross-lappers 16', 17', 18' or both. Conversely, a nonwoven web having a lesser number of single layers can be achieved by increasing the speed of conveyor 20 relative to the speed at which the cross-lappers 16', 17', 18' reciprocate, by decreasing the number of cross-lappers 16', 17', 18' or both. As disclosed herein, it is contemplated that the number of single layers which make up the first web of charring and nonwoven fibers and the number of single layers which make up the second web of nonwoven fibers can be approximately the same or can vary depending on the desired characteristics of the FR nonwoven fiber batt to be constructed. Accordingly, it is contemplated that the speed of the conveyor 20 relative to the speed at which the cross-lappers 16', 17', 18' reciprocate and/or the number of cross-lappers 16', 17', 18' used to form the first web may differ from that used to form the second web.

Referring back to FIG. 1, for the configuration of the bi-layer FR nonwoven fiber batt which includes a first, barrier layer in combination with a second, sacrificial, layer, the process further includes disposing a surface of the first web in a conforming relationship to a surface of the second web. Of course, for the configuration of the uni-layer FR nonwoven fiber batt which includes only a single, barrier, layer, the disposing of a surface of the first web in a conforming relationship to a surface of the second web is omitted.

While it is fully contemplated that a variety of thermal bonding processes may be used as part of the construction of the various FR nonwoven fiber batts disclosed herein, one such method comprises holding the first web (or the first and second webs) using vacuum pressure applied through perforations of first and second counter-rotating drums and heating the first web (or the first and second webs) so that the relatively low melting temperature binder fibers in the first web (or the first and second webs) soften or melt to the extent necessary to fuse the low melt binder fibers together and to the charring and carrier fibers in the first web (or to fuse the low melt fibers together and to the carrier fibers in the second web. Alternatively, the first web (or the first and second webs) may be moved through an oven which melts the low temperature binder fibers of the first web (or the first and second webs) using substantially parallel perforated or mesh wire aprons.

Figure 3A:
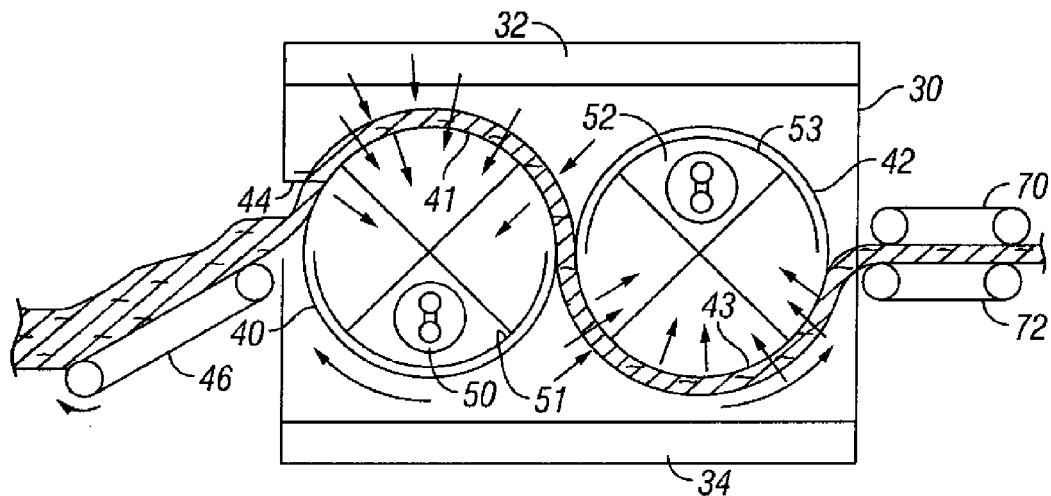
FIG. 3A is a schematic side view of a thermal bonding apparatus forming part of the processing line of FIG. 2.

Referring collectively to FIGS. 2 and 3A, the thermal bonding process which utilizes vacuum pressure to construct the various FR nonwoven fiber batts disclosed herein will now be described in greater detail. As may now be seen, counter-rotating drums 40, 42, each having perforations 41, 43, respectively, are positioned in a central portion of a housing 30. If desired, the drums 40, 42 may be mounted for lateral sliding movement relative to one another, thereby facilitating the adjustment of the drums 40, 42 for a wide range of web thicknesses. Typically, lateral sliding of the drums 40, 42 is enabled using additional components not shown in FIG. 3A. The housing 30 further includes an air circulation chamber 32 in an upper portion thereof and a furnace 34 in a lower portion, thereof. The drum 40 is positioned adjacent an inlet 44 though which the first web (or the first and second webs) is (are) fed. More specifically, an infeed apron 46 delivers the first web (or the first and second webs) to the drum 40 after formation of the first web (or the first and second webs) is (are) complete. As the drum 40 rotates in a clockwise direction, a suction fan 50 in communication with the interior of the drum 40 creates an air flow which enters the drum 40 through the perforations 41 proximate the upper portion of the drum 40. In the meantime, a baffle 51 shields the lower portion of the drum 40, thereby preventing the air flow from also entering the drum 40 through the perforations proximate the lower portion of the drum 40.

The drum 42 is downstream from the drum 40 in housing 30. Similar to the drum 40, the drum 42 includes a suction fan 52 in communication with the interior of the drum 42 and a baffle 53. As the drum 42 rotates in a counterclockwise direction, the suction fan 52 creates an air flow which enters the drum 40 through the perforations 43 proximate the lower portion of the drum 42. In the meantime, the baffle 52 shields the upper portion of the drum 42, thereby preventing the air flow from also entering the drum 42 through the perforations proximate the upper portion of the drum 40.

The first web (or the first and second webs) is (are) held in vacuum pressure as it moves from the upper portion of the clockwise rotating drum 40 to the lower portion of the counterclockwise rotating drum 42. As the air in the housing 30 flows through the perforations 41, 43 into the respective interiors of the drums 40, 42, the furnace 34 heats the air, to soften or melt the relatively low melting temperature binder fibers include in the first web (or the first and second webs) to the extent necessary to fuse the low melt binder fibers together and to the charring and carrier fibers in the first web (or to fuse the low melt binder fibers together and to the charring and carrier fibers in the first web and fuse the low melt binder fibers together and to the carrier fibers in the second web).

Figure 3B:
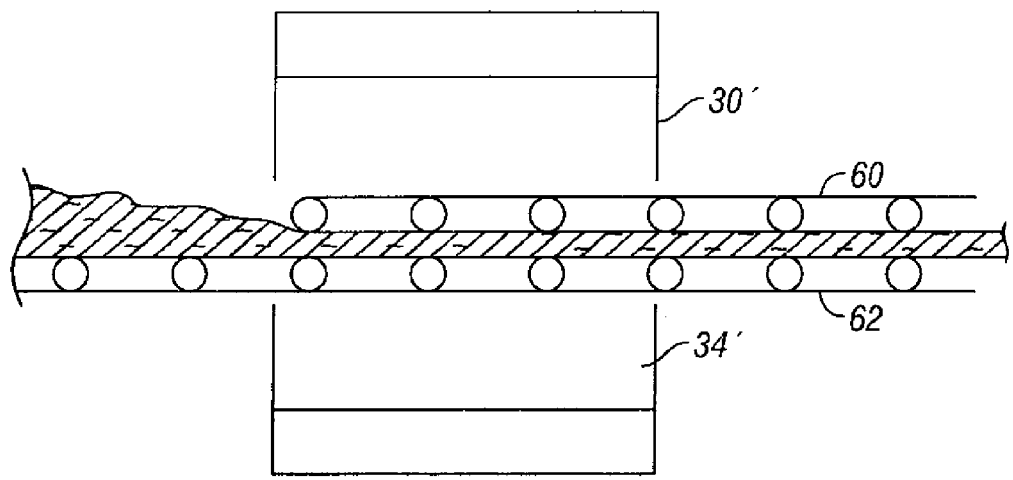
FIG. 3B is a schematic side view of a thermal bonding apparatus suitable in place of the thermal bonding apparatus of FIG. 3A.

Referring next to FIG. 3B, in an alternative thermal bonding process, a pair of substantially parallel perforated or mesh wire aprons 60, 62 feed the first web (or first and second webs) into housing 30'. The housing 30' includes an oven 34' which heats the first web (or first and second webs) to soften or melt the relatively low melting temperature binder fibers include in the first web (or the first and second webs) to the extent necessary to fuse the low melt binder fibers together and to the charring and carrier fibers in the first web (or to fuse the low melt binder fibers together and to the charring and carrier fibers in the first web and fuse the low melt binder fibers together and to the carrier fibers in the second web).

Next, referring collectively to FIGS. 2 and 3A, as the uni-layer or bi-layer FR nonwoven fiber batt is transported out of the housing 30 by a pair of substantially parallel first and second perforated or wire mesh aprons 70, 72, the FR nonwoven fiber batt is compressed and cooled. If desired, the aprons 70, 72 may be mounted for parallel movement relative to one another, thereby facilitating the adjustment of the aprons 70, 72 for a wide range of batt thicknesses. Variously, the FR nonwoven fiber batt may be slowly cooled through exposure to ambient temperature air or, in the alternative, ambient temperature air can forced through the perforations of one apron 70, 72, through the FR nonwoven fiber batt and then through the perforations of the other apron 70, 72 to cool the FR nonwoven fiber batt and set it in its compressed state. The solidification of the low melt temperature binder fibers bonds the low melt binder, carrier and charring fibers together, thereby enabling the FR nonwoven fiber batt to maintain its compressed state.

Next, referring collectively to FIGS. 1 and 2, the cooled uni-layer or bi-layer FR nonwoven fiber batt is then transported to cutting zone 80. There, the lateral edges of the FR nonwoven fiber batt are trimmed to a finished width. The FR nonwoven fiber batt is also cut transversely to a desired length.

Figure 4:
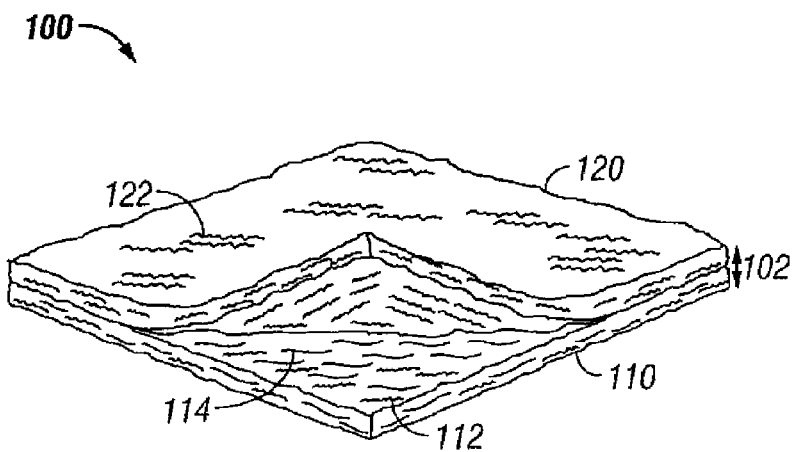
FIG. 4 is a perspective top view of a bi-layer FR nonwoven fiber batt, formed in accordance with the method of FIG. 1, having a first, barrier, layer and a second, sacrificial, layer.
Figure 5:
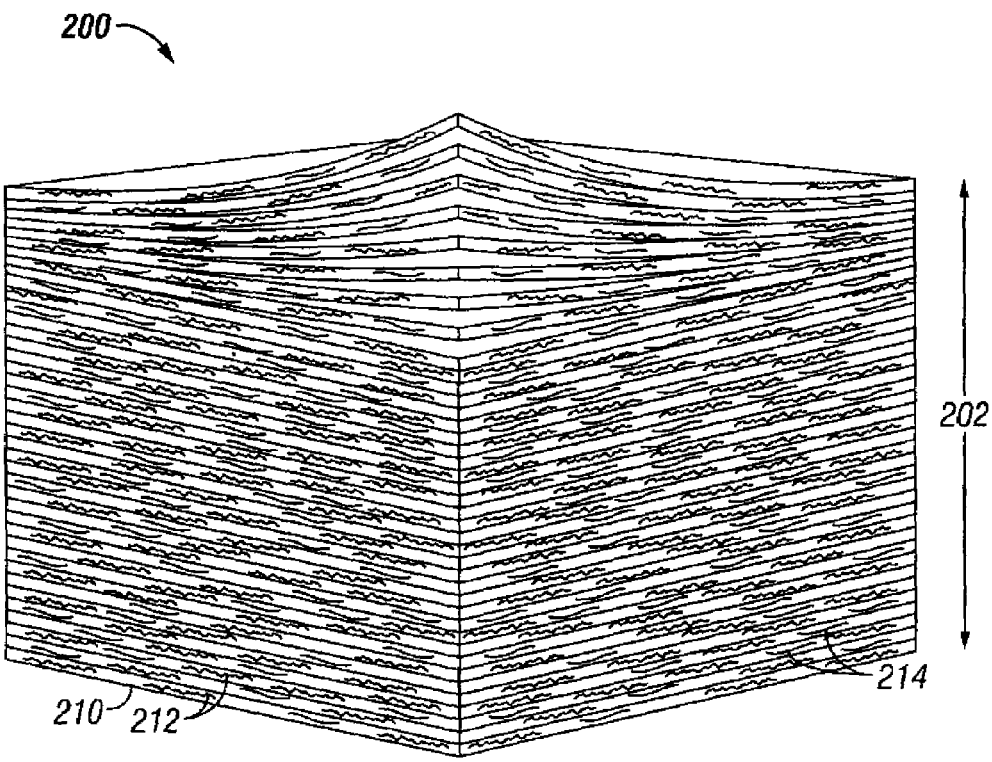
FIG. 5 is a perspective top view of a uni-layer FR nonwoven fiber batt, formed in accordance with the method of FIG. 1, having a single, barrier, layer.

Referring next to FIGS. 4 and 5, first and second FR nonwoven fiber batts 100 and 200, each of which are formed in accordance with the process of FIG. 1 using the processing line 10 of FIG. 2 will now be described in greater detail. As may now be seen, the first FR nonwoven fiber batt 100 is a uni-layer FR nonwoven fiber batt which includes a charring layer comprised of a first web 110 formed from nonwoven fibers 112, for example, carrier fibers and binder fibers, and charring fibers 114, for example, oxidized PAN fibers, and a sacrificial layer comprised of a second web 120 formed from nonwoven fibers 122, for example, carrier fibers and binder fibers. In contrast, the second FR nonwoven fiber batt 200 is a bi-layer FR nonwoven fiber batt comprised of a single charring layer comprised of a first web formed from nonwoven fibers, for example, carrier fibers and binder fibers, and charring fibers, for example, oxidized PAN fibers.

The weight, density and thickness 102, 202 of the first and second FR nonwoven fiber batts 100 and 200, respectively are determined by a variety of factors, including, but not limited to, the extent to which the FR nonwoven fiber batt is compressed during the cooling process. More specifically, the ratio of fiber batt density to fiber batt thickness dictates whether the first and second FR nonwoven fiber batts 100 and 200 would be classified as a high loft fiber batt, a compact fiber batt or a densified fiber batt. Purely by way of example, the FR nonwoven fiber batt 100 is a high loft batt of a first thickness 102 while the FR nonwoven fiber batt 200 is a densified batt of a second thickness 202 greater than the first thickness. It is fully contemplated, however, that the FR nonwoven fiber batt 100 may instead be formed as a compact batt or a densified batt and that the FR nonwoven fiber batt 200 may instead by formed as a compact batt or a high loft batt. Furthermore, while the characterization of the first and second FR nonwoven fiber batts 100 and 200 are based upon the ratio of weight to thickness of the batt as a whole, in multi-layer configurations such as the first FR nonwoven fiber batt 100, it is contemplated that the characterization of the batt may be made on a layer-by-layer basis. For example, the charring layer 110 of the first FR nonwoven fiber batt 100 may be a densified layer while the sacrificial layer 120 may be a high loft layer. Again, the foregoing is for purposes of illustration and it is contemplated that each of the charring and sacrificial layers 110 and 120 may each be formed as either a densified, compact or high loft layer. Finally, it should be clearly understood that the thickness 102 of the first FR nonwoven fiber batt 100 relative to the thickness 202 of the second FR nonwoven batt 200 is also purely by way of example and that the first FR nonwoven fiber batt 100 may instead have a thickness equal to or greater than the thickness 202 of the second FR nonwoven fiber batt 200. Similarly, for the first FR nonwoven fiber batt 100, the thickness of the charring layer 110 may be less than, equal to or greater than the thickness of the sacrificial layer 120.

Tables I, II and III provides examples of various weights and corresponding thicknesses of batts processed by the thermal bonding method of the present invention.

TABLE I*

| Weight (oz./sq. ft.) | Thickness (in.) |
|---|---|
| ¼–½ | ½ |
| ½–¾ | ¾ |
| ¾–1 | ⅞ |
| 1–1¼ | 1¼ |
| 1¼–1½ | 1½ |
| 1½–1¾ | 1¾ |
| 1¾–2 | 2 |
| 2–2¼ | 2¼ |
| 2¼–2¾ | 2¾ |
| 2¾–3 | 3 |
| 3–3½ | 3½ |
| 3½–4 | 4 |

*Suitable blends for the weights and thicknesses in Table I are thermally bonded batts having bicomponent low melt binder fibers in the amount of approximately 10 percent to 20 percent by total volume of the blend. The remaining blend volume comprises a relative percent volume of charring fibers to carrier fibers in the range of approximately 15 percent to 85 percent by relative volume.

TABLE II*

| Weight (oz./sq. ft.) | Thickness (in.) |
|---|---|
| ⅜–¾ | ¼ |
| ¾–1½ | ½ |
| 1⅛–2¼ | ¾ |
| 1⅜–2⅜ | ⅞ |
| 1½–3 | 1 |
| 1⅝–3⅜ | 1⅛ |
| 1⅞–3¾ | 1¼ |
| 2¼–4½ | 1½ |
| 2⅝–5¼ | 1¾ |
| 3–6 | 2 |
| 3¼–6⅜ | 2⅛ |
| 3⅜–6¾ | 2¼ |
| 3¾–7½ | 2½ |
| 4⅛–8¼ | 2¾ |
| 4½–9 | 3 |

*Suitable blends for the weights and thicknesses in Table II are thermally bonded batts having bicomponent low melt binder fibers in the amount of approximately 10 percent to 20 percent by total volume of the blend. The remaining blend volume comprises a relative percent volume of charring fibers to carrier fibers in the range of approximately 15 percent to 85 percent by relative volume. The batts are compressed to a ratio of weight (ounces per square foot) to thickness (inches) in the range of about 1.5 to 1 ratio up to about 3 to 1 ratio.

TABLE III*

| Weight (oz./sq/ft.) | Thickness (in.) |
|---|---|
| 4–6¼ | 3⅛ |
| 4⅛–6½ | 3¼ |
| 4⅜–7 | 3½ |
| 4⅝–7½ | 3¾ |
| 5–8 | 4 |
| 5⅛–8¼ | 4⅛ |
| 5¼–8½ | 4¼ |
| 5⅝–9 | 4½ |
| 5⅞–9½ | 4¾ |
| 6¼–10 | 5 |
| 6⅜–10¼ | 5⅛ |
| 6½–10½ | 5¼ |
| 6⅞–11 | 5½ |
| 7¼–11½ | 5¾ |
| 7½–10½ | 6 |
| 7⅝–10⅝ | 6⅛ |
| 7⅞–11 | 6¼ |
| 8⅛–11⅜ | 6½ |
| 8½–10⅛ | 6¾ |
| 8¾–10½ | 7 |
| 8⅞–10⅔ | 7⅛ |

TABLE III*-continued

| Weight (oz./sq/ft.) | Thickness (in.) |
|---|---|
| 9–10⅞ | 7¼ |
| 9⅜–11¼ | 7½ |
| 9⅝–11 1/16 | 7¾ |
| 10–12 | 8 |

*Suitable blends for the weights and thicknesses in Table III are thermally bonded batts having bicomponent low melt binder fibers in the amount of approximately 10 percent to 20 percent by total volume of the blend. The remaining blend volume comprises a relative percent volume of charring fibers to carrier fibers in the range of approximately 15 percent to 85 percent by relative volume. The batts are compressed to a ratio of weight (ounces per square foot) to thickness (inches) in the range of about 1.25 to 1 ratio up to about 2 to 1 ratio.

Figure 6:
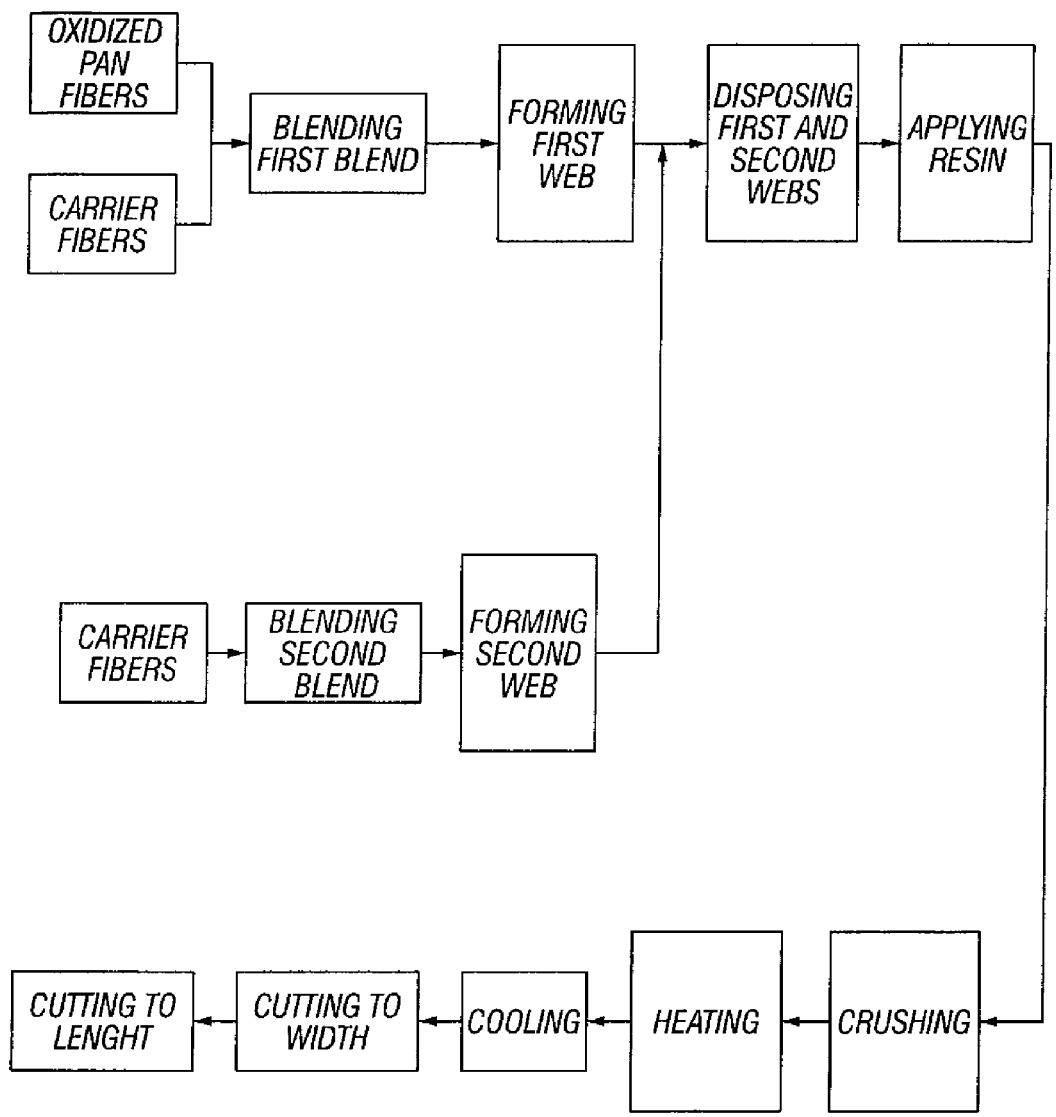
FIG. 6 is a schematic flow chart of an alternate method of forming either a uni-layer FR nonwoven fiber batt comprised of a single, barrier, layer or a bi-layer FR nonwoven fiber batt comprised of a first, barrier, layer and a second, sacrificial, layer.

Referring to FIG. 6, an alternate method of forming either a uni-layer FR nonwoven fiber batt comprised of a single, barrier, layer or a bi-layer FR nonwoven fiber batt comprised of a first, barrier, layer and a second, sacrificial, layer may now be seen. More specifically, rather than the thermal bonding process illustrated in FIG. 1, FIG. 6 illustrates a resin bonding process. As before, charring fibers such as oxidized PAN fibers and carrier fibers are blended to form a first web. Low melt temperature binder fibers are not required as a heat curable binder material is used. The charring fibers and carrier fibers of the blend for the thermal bonding process are suitable for this application as well. For example, Pyron® is a suitable charring fiber, specifically an oxidized PAN fiber, and thermoplastic fibers such as polyester, and more specifically, KoSa Type 209 or KoSa Type 295 are suitable carrier fibers. However, other synthetic and natural fibers can be used depending upon the precise processing limitations imposed and the characteristics of the batt which are desired at the end of the process. While the mixture of charring fibers and carrier fibers in the first web for the resin bonding method can be any of a number of suitable fiber blends, for purposes of illustrating the process, the first blend is comprised of charring fibers such as oxidized PAN fibers in the range of approximately 15 percent to 100 percent by volume and corresponding carrier fibers in the range of approximately 85 percent to a negligible amount.

In a manner similar to the thermal bonding process, the resin bonding process can also optionally comprise a second blend of nonwoven fibers, for example, carrier fibers to form a second web. The nonwoven fibers can be the same as or similar to those blended with the charring fibers discussed above, such as, for example, polyester thermoplastic polymer fibers. Other synthetic or natural fibers can be used depending upon the precise processing limitations imposed and the characteristics of the second web which are desired at the end of the process. Again, as before, binder fibers are not necessary. Accordingly, the second blend of nonwoven fibers may be entirely comprised of a carrier fibers such as polyester fibers.

The resin bonding process further comprises forming first and second webs from first and second blends, respectively, using web forming machines such as gametts, cross-lappers or air laying apparatus. The method also comprises the step of disposing a surface of the first web in a conforming relationship to a surface of the second web to form the batt. While the second nonwoven web provides a lighter color to a surface of the batt and may impart additional loft and comfort, alternatively, a relatively thin layer of a nonwoven facing material may be suitable for reinforcement to the first web of charring and carrier fibers. The web and batt forming steps for the resin bonding method are generally similar to those for the thermal bonding process which details are discussed above. An air laying machine can also be used. Generally, the fibers are introduced into an air stream which carries the fibers to an air permeable support such as a perforated drum which is rotating. Accumulation of the fibers onto the drum surface results in a web formation. A vacuum is applied through the web from one side of the web to the other and through said air permeable support sufficient to reduce the thickness and increase the density of the web throughout the thickness of the web to form a batt.

Heat curable resin is then applied to the batt for bonding the web fibers. While there are a variety of applications, generally resin in the form of liquid is sprayed while froth resin is extruded onto the batt. Alternatively, the batt is fed or dipped into a bath of resin. Resins suitable for the present invention are curable by heat and can be any of a variety of compositions. Generally, the resin is comprised of latex or acrylic binders. Additionally, the resin can comprise fire resistant chemicals which further enhance the fire resistance of the finished batt.

In the application of liquid resin, as the uni-layer or bi-layer FR nonwoven fiber batt moves along a conveyor in the machine direction, the resin is sprayed onto the fiber batt from one or more spray heads which move in a transverse or cross direction to substantially coat the batt. Froth resin is extruded onto the batt using a knife or other means. The fiber batt could also be fed through or dipped into a resin bath. The applied resin is crushed into the fiber batt for saturation therethrough by nip rollers which are disposed along the transverse direction of the conveyor to apply pressure to the surface of the fiber batt. Alternatively, the resin is crushed into the fiber batt by vacuum pressure applied through the fiber batt. The fiber batt moves into an oven heated to a temperature which cures the resin. The fiber batt exits the oven and is cooled. The fiber batt is maintained substantially in its oven state upon cooling since the heat cures the resin which bonds the fibers of the fiber batt together in this state. The fiber batt moves into a cutting zone where its lateral edges are trimmed to a finished width and it is cut transversely to the desired length.

Referring to FIG. 7, a bi-layer FR nonwoven fiber batt 300 formed by the resin saturated bonding process of FIG. 6 may now be seen. Batt 300 is comprised of a first, barrier layer formed from a first web 310 having carrier fibers 312 and charring fibers 314 and a relatively thin sacrificial layer 320 formed from carrier fibers. The weight, density and thickness 302 of the bi-layer FR nonwoven fiber batt 300 are determined by, among other factors, the heating process which cures the resin and fixes the web in this state. Depending on the processing conditions and the desired fiber batt characteristics, it is contemplated that the bi-layer FR nonwoven fiber batt 300 may variously be a high loft fiber batt, a compact fiber batt or a densified fiber batt. Table IV provides examples of various weights and corresponding thicknesses of batts processed by the resin bonding method of the present invention.

TABLE IV*

| Weight (oz./sq/ft.) | Thickness (in.) |
|---|---|
| ¼–¾ | ⅛–¼ |
| ¾–1½ | ¼–½ |
| 1½–3 | ½–1 |

*Suitable blends for the weights and thicknesses in Table IV are resin bonded batts having from 15 percent oxidized PAN fibers up to 100 percent and the remaining volume of polymer carrier fibers.

Referring to FIGS. 8A and 8B, side views of a traditional mattress and one which incorporates either the thermal or resin bonded, uni-layer or bi-layer FR nonwoven fiber batts disclosed herein may now be seen. In the construction of a traditional mattress 400, upper structure 420 positioned over the coil structure 440 includes a quilt panel 422 comprising a cover or ticking 424, a layer of fiber 426 and a quilt backing 428. Ticking 424, fiber layer 426 and quilt backing 428 are stitched together and form quilt pattern 423. The quilt panel 422 provides loft, comfort and resilience to the mattress 400. Upper structure 420 of the mattress 400 further comprises a layer of foam filling 430 which imparts durability to the mattress 400 as the foam is relatively stiff as compared to a fiber layer. An insulator 432 separates the foam filling 430 from the coils 440 to minimize the wear of the foam filling 430 which coils 440 may impart. The lower structure positioned under the coil structure 440 is a mirror image of the upper structure 440 and thus is not shown.

Referring next, in combination, to FIGS. 4, 5, 7 and 8B, a mattress 400' which incorporates the FR nonwoven fiber batts disclosed herein may now be seen. More specifically, quilt panel 422' of upper structure 420' is comprised of ticking 424, a resin bonded densified fiber batt 300 having a light colored nonwoven layer 320 proximate the ticking 424, a thermally bonded high loft batt 110 of oxidized PAN and nonwoven fibers and a resin bonded densified batt 310 which replaces the quilt backing 428. The resin bonded fiber batt 300 provides fire resistant properties to the mattress near its surface where a flame is likely to contact while providing a light color for aesthetic purposes. The thermal bonded high loft FR nonwoven fiber batt 110 provides sufficient loft, comfort and resilience to effectively replace the fiber layer 426 of the traditional mattress quilt panel 422 while imparting additional fire resistance to the mattress. Upper structure 420' of mattress 400' further comprises a thermally bonded densified batt fiber batt 200 which replaces foam filling 430 to impart durability to mattress 400'. Insulator 432 is replaced with resin bonded fiber batt 310 to enhance the fire resistant properties of mattress 400. A second thermally bonded densified fiber batt 200 replaces the coil structure 440.

Figure 9:
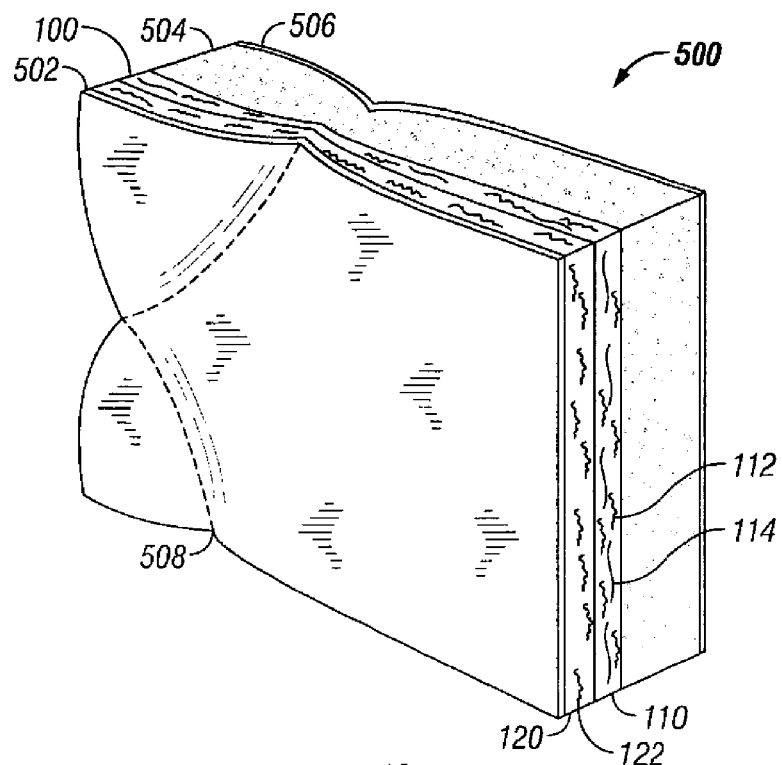
FIG. 9 is a side view of a mattress border which incorporates the bi-layer FR nonwoven fiber batt of FIG. 4.

Referring to FIG. 9, a mattress border 500 constructed of a thermally bonded high loft FR nonwoven fiber batt 100 may now be seen. Border 500 further comprises ticking 502, a foam layer 504 and a quilt backing 506. The high loft FR nonwoven fiber batt 100 is a bi-layer fiber batt having a sacrificial layer 120 of carrier and binder fibers 122 which is proximate ticking 502 and a barrier layer 110 of charring fibers 114 and carrier and binder fibers 112 which is proximate the foam layer 504. Ticking 502, bi-layer FR nonwoven fiber batt 100, foam layer 504 and quilt backing 506 are stitched together and form quilt pattern 508. The thermal bonded high loft bi-layer FR nonwoven fiber batt 100 provides loft, comfort and resilience to the mattress border 500 while providing fire resistant properties to the mattress border 500 and a light color sacrificial layer 120 of carrier and binder fibers 122 proximate ticking 502 for aesthetic purposes.

The thermal and resin bonded uni-layer and bi-layer nonwoven fiber batts formed from the methods disclosed herein offer substantial advantages as fire barrier layers in a wide variety of products, particularly as mattress components described above. Fire tests conducted on three mattresses which incorporate various batts of the present invention were conducted under the State of California Technical Bulletin 129 Flammability Test Procedure for Mattresses for Use in Public Building, October 1992. A brief description of the test is as follows. A mattress is placed on a support system. Flames from a multi hole burner (fueled by propane at the rate of 12 1/min) impinge on the side of the mattress for a period of 180 seconds. Test observations are made. The tests were performed on mattresses comprising the fire combustion modified batts to determine, among other things, the burning behavior of the mattresses by measuring the response time which the fire barrier layers would provide to a fire victim to safely escape and a fire department to successfully extinguish the fire.

In a first test, a traditional mattress comprising a quilt panel of ticking, a polyester fiber layer, a urethane foam layer and a quilt backing, two layers of foam and an insulator proximate the coil structure was tested under the California Technical Bulletin 129. The test ended after 1 minute 27 seconds when unsafe escalating combustion was noted. In a second test, a thermally bonded high loft FR nonwoven fiber batt replaced the polyester fiber layer beneath the ticking of a mattress described under the first test. The thermally bonded high loft FR nonwoven fiber batt was a bi-layer fiber batt which included a first layer comprised of approximately 10 to 15 percent by volume of binder polyester fibers and the remaining volume was a 50 to 50 percent by volume blend of Pyron® oxidized PAN fibers and polyester carrier fibers. The bi-layer FR nonwoven fiber batt further comprised a second layer of approximately 10 to 15 percent by volume of binder polyester fibers and the remaining volume was carrier polyester fibers. The weight of each layer was approximately 0.5 ounce per square inch for a total batt weight of about 1 ounce per square inch. The second test ended after 18 minutes 40 seconds before unsafe escalating combustion was noted. Thus, the use of a fire barrier layer in a mattress as described in the second test effectively increased the time by 17 minutes 13 seconds over the traditional mattress of the first test. This increase could provide valuable time for a fire victim to escape or a fire department to extinguish the fire.

In a third test, a densified resin bonded FR nonwoven fiber batt replaced the insulator proximate the coil structure of the traditional mattress of the first test. The densified FR nonwoven fiber batt was a uni-layer fiber batt comprised of 50 percent by volume of oxidized PAN fibers and 50 percent by volume of polyester fibers and weighed about ¾ ounces per square *foot*. T*he* third test ended after 30 minutes 43 seconds before unsafe escalating combustion was noted. Thus, the use of a densified uni-layer FR nonwoven fiber batt formed from the techniques disclosed herein substantially increases the time over the traditional mattress of the first test by 29 minutes 16 seconds.

The thermal and resin bonded uni-layer and bi-layer FR nonwoven fiber batts formed using the methods disclosed herein offer substantial advantages as fire barrier layers in other products as well. For example, a thermally bonded FR nonwoven fiber batt having a density of less than 1.5 pounds per cubic foot, a high loft batt, can be used as a wrap for or an additional layer to cushion seats, backs and arms in furniture, vehicle and aircraft seats. In seats having a light colored decorative covering, the fiber batt comprising a layer of nonwoven fibers would be positioned with the light colored layer proximate the decorative covering to essentially hide the dark color oxidized PAN fiber. The thermally bonded high loft FR nonwoven fiber batt is also suitable as an insulation lining in apparel and fire safety gear such as, for example, in fire fighter jackets and oven mitts for welding or industrial furnace purposes. Further, the high loft FR nonwoven fiber batt is suitable as a fire barrier air filter and as an insulator for appliances such as hot water tanks and furnaces. Insulation for building walls and recreational vehicle wall cavities are also suitable applications of the high loft FR nonwoven fiber batt.

Thermal bonded FR nonwoven fiber batts formed from the method disclosed herein and having a density of about 1.5 pounds per cubic foot or greater, are densified batts, are suitable as a replacement to cushion backs, seats and arms in furniture, vehicle and aircraft seats. The densified FR nonwoven fiber batts are also suitable as replacements for mattress cores, such as, for example, the foam or inner springs in mattresses, particularly for use in public occupancies and correctional institutions. Additionally, densified thermally bonded FR nonwoven fiber batts are suitable for insulation lining in apparel and safety gear such as race driver suits, and as insulation for walls, furnaces and ducting applications. Densified thermally bonded FR nonwoven fiber batts are particularly suitable for sound deadening and thermal transfer applications.

Resin bonded FR nonwoven fiber batts, preferably densified batts which are relatively thin, having a thickness in the range of approximately 1/8 inch to approximately 1/2 inch, have applications as dust covers in mattresses and furniture. Densified resin bonded FR nonwoven fiber batts are also suitable as wraps for cushion seats, backs and arms and for deck padding for furniture and curtain backing material. Further applications include wraps for hot water tanks and furnaces and fire and heat shields in building and vehicle walls.

Thusfar, we have described two discrete FR nonwoven fiber batts, both of which were disclosed and claimed in our prior Nonprovisional U.S. patent application Ser. No. 10/221,631 filed Sep. 13, 2002 and Nonprovisional U.S. patent application Ser. No. 10/968,318 filed Oct. 18, 2004, both assigned to the Assignee of the present application and previously incorporated by reference as if reproduced in their entirety. The first FR nonwoven fiber batt disclosed herein, more specifically, the FR nonwoven fiber batt 100 illustrated in FIG. 4, was a bi-layer FR nonwoven fiber batt comprised of a first, charring, layer 110 and a second, sacrificial, layer 120. The charring layer 110 is the first web formed by the process illustrated in FIG. 1 from a blend of charring fibers 112, for example oxidized PAN, and nonwoven fibers 114. While the nonwoven fibers are typically a blend of carrier fibers and binder fibers, it is contemplated that the nonwoven fibers may be entirely comprised of carrier fibers (if the resin bonding technique disclosed in FIG. 6 is used in place of the thermal bonding technique disclosed in FIG. 1) or entirely comprised of binder fibers.

In use, for example, as part of a mattress, the bi-layer FR nonwoven fiber batt 100 was typically oriented such that the second layer 120 served as an outer layer for the bi-layer FR nonwoven fiber batt 100 while the first layer 110 served as an inner layer for the bi-layer FR nonwoven fiber batt 100. Importantly, it was noted that the outer layer 120 of the two-layer FR nonwoven fiber batt 100 tended to compensate for certain shortcomings of a uni-layer FR nonwoven fiber batt, for example, the FR nonwoven fiber batt 200 illustrated in FIG. 5, having a composition generally identical to that of the inner layer 110 of the two-layer FR nonwoven fiber batt 100. For example, the tendency of the outer layer 120 to melt and drip rather than burn when exposed to a flame generally delayed the exposure of the inner layer 110 to the flame. As a result, the structural integrity of the inner, charring, layer 110 tended to be maintained for a longer period when covered with the outer layer 120.

More importantly, however, the outer layer 120 of the bi-layer FR nonwoven fiber batt 100 tended to greatly improve the aesthetics of the bi-layer FR nonwoven fiber batt 100 relative to the single-layer FR nonwoven fiber batt 200 having a composition generally identical to that of the inner layer 110 of the bi-layer FR nonwoven fiber batt 100. Specifically, the inner layer 110 is formed of a charring fiber which, while generally characterized by both resistance to flame and structural integrity when exposed to flame, is also black in color. Generally, irrespective of their oftentimes superior FR characteristic, black or other dark colored nonwoven fiber batts are typically disfavored for use in a variety of applications, for example, mattress or bedding applications, where consumer preference has been for white or other light colored fiber batts. Thus, the light colored outer layer 120 of the bi-layer FR nonwoven fiber batt 100 tended to cover or otherwise obscure the darker colored inner layer 110 of the two-layer FR nonwoven fiber batt 100, thereby resulting in a much more aesthetically pleasing FR nonwoven fiber batt.

A second bi-layer FR nonwoven fiber batt will now be described in greater detail. While differing significantly in configuration from the bi-layer FR nonwoven fiber batt hereinabove described, a similar principle—specifically, producing a bi-layer FR nonwoven fiber batt in which the composition of the second, or outer, layer results in the bi-layer FR nonwoven fiber batt as being significantly improved over a uni-layer FR nonwoven fiber batt having a composition generally identical to the first, or inner, layer of the bi-layer FR nonwoven fiber batt—relates the FR nonwoven fiber batt to one another. Such a two-layer FR nonwoven fiber batt will now be described in greater detail with respect to FIGS. 10, 11A, 12A and 13A.

Figure 10:
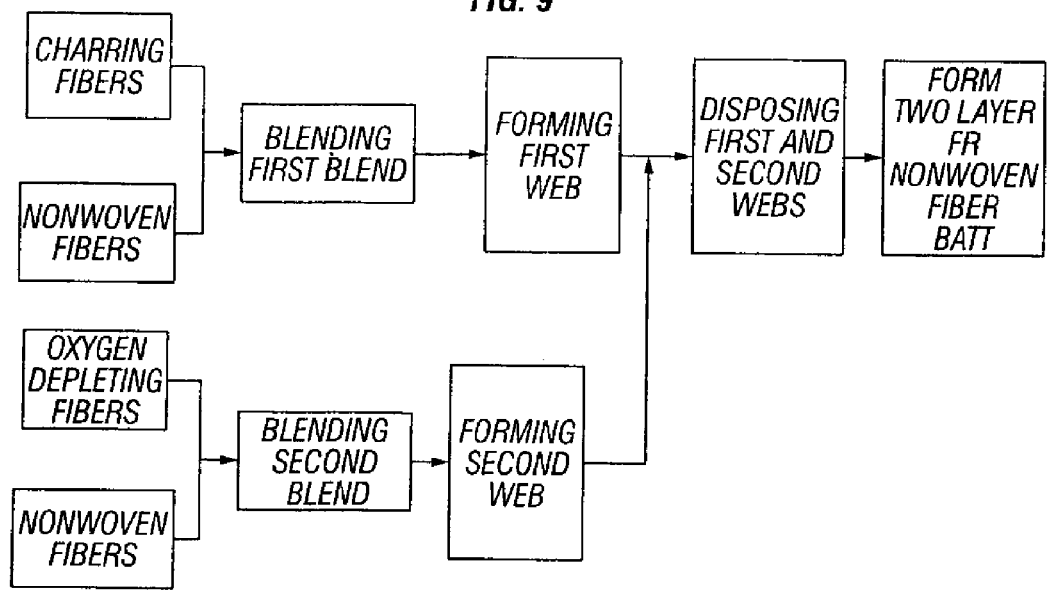
FIG. 10 is a flow chart of a first method of forming either a uni-layer or bi-layer FR nonwoven fiber batt constructed in accordance with the teachings of the present invention and having both charring and oxygen-depleting fibers therein.

Referring now to FIG. 10, the method of forming a bi-layer FR nonwoven fiber batt constructed in accordance with the teachings of the present invention is formed will now be described in greater detail. It should be noted that the method described and illustrated in FIG. 10 is similar in many regards to both the method of forming a bi-layer FR nonwoven fiber batt illustrated in FIG. 1 as well as the method of forming a bi-layer FR nonwoven fiber batt described and illustrated in FIG. 6. In this regard, it is contemplated that either one of the method of forming an FR nonwoven fiber batt of FIG. 1 or the method of forming an FR nonwoven fiber batt of FIG. 6 may be used to form the bi-layer FR nonwoven fiber batt described and illustrated with respect to FIGS. 10, 11A, 12A and 13A. Accordingly, FIG. 10 has been drawn to accommodate both of these techniques.

The method commences with the blending of charring fibers and nonwoven fibers to form a first fiber blend. By way of example, fibers suitable for use as charring fibers include, among others, FR treated cellulosic fibers such as FR treated rayon or FR treated cotton. While FR treated cellulosic fibers may be made using a wide variety of techniques, one technique suitable to render cotton fibers inherently flame resistant would be to first apply Proban® onto the cotton fibers and then cure the cotton fibers using ammonia gas. Proban® is a phosphorus flame retardant chemical manufactured by Albright and Wilson, Ltd. of West Midlands, England. Other fibers suitable for use as charring fibers include Visil® fibers. Visil® fibers are inherently FR fibers manufactured by Säteri Oy of Valkeakoski, Finland.

It is contemplated that the nonwoven fibers can be natural or synthetic. For example, thermoplastic polymer fibers such as polyester are suitable synthetic fibers. Other fibers can be used depending upon the precise processing limitations imposed and the characteristics of the batt which are desired at the end of the process. It is further contemplated that the nonwoven fibers of the first fiber blend may be comprised of carrier fibers, binder fibers or a combination of carrier fibers and binder fibers. For purposes of illustrating the illustrated process and resultant two-layer FR nonwoven fiber batt and not by way of limitation, if the first fiber blend includes carrier fibers, suitable carrier fibers would include Type 209 fibers and Type 295 fibers, both of which are manufactured by KoSa. Of course, it is fully contemplated that other nonwoven fibers are also suitable for use as the carrier fiber of the first fiber blend.

The binder fiber has a relatively low predetermined melting temperature as compared with the carrier fiber. It is an inherent characteristic of thermoplastic fibers such as polyester that they become sticky and tacky when melted. For purposes of illustrating the process and bi-layer FR nonwoven fiber batt and not by way of limitation, if the first nonwoven fiber blend includes binder fibers, a suitable binder fiber would be Type 254 Celbond® fiber manufactured by KoSa. The Type 254 Celbond® fiber is a bicomponent fiber with a polyester core and a copolyester sheath having a melting temperature of approximately 230° F. (110° C.). Alternately, of course, the binder fibers of the first fiber blend may be polyester copolymer fibers rather than bicomponent fibers.

It is contemplated that the homogeneous mixture of charring fibers and nonwoven fibers which make up the first fiber blend can be any of a number of suitable fiber blends. For example, it is contemplated that the amount of charring fibers included in the first fiber blend could range from as little as about five percent, by volume, to as much as about ninety-five percent, by volume, of FR treated rayon FR treated cotton, Visil® or other suitable charring fibers. Further by way of example, a suitable composition for the first fiber blend would include about seventy-five percent, by volume of a charring fiber, such as FR treated rayon, about ten percent, by volume, of a carrier fiber, such as polyester and about 15 percent, by volume, of a low-melt binder fiber, such as co-polyethylene terephthalate ("co-PET").

Continuing to refer to FIG. 10, the disclosed method of forming a two-layer FR nonwoven fiber batt further comprises includes the step of blending oxygen-depleting fibers and nonwoven fibers to form a second fiber blend. By way of example, fibers suitable for use as oxygen-depleting fibers include the modacrylic fiber PBX, other modacrylic fibers as well as other oxygen-depleting fibers not specifically recited herein.

As was previously disclosed with respect to the nonwoven fibers of the first fiber blend, it is contemplated that the nonwoven fibers of the second fiber blend can be natural or synthetic. For example, thermoplastic polymer fibers such as polyester are suitable synthetic fibers for use in the second fiber blend. Other fibers can be used depending upon the precise processing limitations imposed and the characteristics of the batt which are desired at the end of the process. It is further contemplated that the nonwoven fibers of the second fiber blend may be comprised of carrier fibers, binder fibers or a combination of carrier fibers and binder fibers. For purposes of illustrating the illustrated process and resultant bi-layer FR nonwoven fiber batt and not by way of limitation, if the second nonwoven fiber blend includes carrier fibers, suitable carrier fibers would include Type 209 fibers and Type 295 fibers, both of which are manufactured by KoSa. Of course, it is fully contemplated that other nonwoven fibers are also suitable for use as the carrier fiber of the second fiber blend. Similarly, for purposes of illustrating the process and bi-layer FR nonwoven fiber batt and not by way of limitation, if the second nonwoven fiber blend includes binder fibers, a suitable binder fiber would be Type 254 Celbond® bicomponent fiber manufactured by KoSa. Alternately, of course, the binder fibers of the second fiber blend may be polyester copolymer fibers rather than bicomponent fibers.

It is contemplated that the homogeneous mixture of oxygen-depleting fibers and nonwoven fibers can be any of a number of suitable fiber blends. For example, it is contemplated that the amount of oxygen-depleting fibers included in the second fiber bend could range from as little as about five percent, by volume, to as much as about ninety-five percent, by volume, of the modacrylic fiber PBX, another modacrylic fiber, or another suitable oxygen-depleting fiber. Further by way of example, a suitable composition for the second web blend may include about forty-five percent, by volume of an oxygen-depleting fiber, such as the modacrylic fiber PBX, another modacrylic fiber or another suitable oxygen-depleting fiber, about forty percent, by volume, of a carrier fiber, such as polyester, and about fifteen percent, by volume, of a low-melt binder fiber, such as co-PET.

Referring now, in combination to FIGS. 2 and 10, the processing line 10 illustrated in FIG. 2 may be used for forming the bi-layer FR nonwoven fiber batt constructed in accordance with the teachings of the present invention will now be described in greater detail. The following example is directed to the formation of a web in general and thus is applicable to forming both the first web comprised of a blend of FR treated rayon fibers and nonwoven fibers and the second web comprised of a blend of the modacrylic fiber PBX and nonwoven fibers. As before, fibers, whether they are the FR treated rayon fibers and the nonwoven fibers or the modacrylic fibers and the nonwoven fibers are blended in the fiber blender 12 and conveyed by the conveyor pipes 14 to the web forming machines 16, 17, 18, for example, garnett machines. Garnett machines 16, 17, 18 card the blended fibers into a nonwoven web having a desired width and deliver the web to the cross-lappers 16', 17', 18' to cross-lap the web onto the slat conveyor 20 which is moving in the machine direction. The cross-lappers 16', 17' 18' reciprocate back and forth in the cross direction from one side of the conveyor 20 to the other side to form the web having multiple thicknesses in a progressive overlapping relationship. The number of layers which make up the web is determined by the speed of the conveyor 20 in relation to the speed at which successive layers of the web are layered on top of each other and the number of the cross-lappers 16', 17', 18'. In the present invention, the number of single layers which make up the first web of FR treated rayon and nonwoven fibers and the second web of the modacrylic fiber PBX and nonwoven fibers can be approximately the same or can vary depending on the desired characteristics of the bi-layer FR nonwoven fiber batt of the present invention. Accordingly, the relative speed of the conveyor 20 to the speed at which cross layers are layered and the number of cross-lappers 16', 17', 18' for forming the first web and the second web may be different.

The conveyor 20 then transports the web to the housing 30 for thermal bonding thereof. While there are a variety of thermal bonding methods which are suitable for the purposes contemplated herein, one such method comprises using vacuum pressure applied through perforations (not shown) in first and second counter rotating drums 40 and 42 positioned in a central portion of the housing 30 and heating the web to the extent necessary such that the relatively low melting temperature binder fibers in the web fuse the low melt binder fibers together and to the polyester carrier and FR treated rayon fibers of the first web or to the polyester carrier and the modacrylic PBX fibers of the second web, respectively. Alternatively, the web may instead move through an oven by substantially parallel perforated or mesh wire aprons to melt the low temperature binder fibers.

As it exits the housing 30, the web is compressed and cooled by a pair of substantially parallel wire mesh aprons 70, only one of which is visible in FIG. 2. The aprons 70 are mounted for parallel movement relative to each other to facilitate adjustment for a wide range of web thicknesses. The web can be cooled slowly through exposure to ambient temperature air or, in the alternative, ambient temperature air can forced through the perforations of one apron 70, through the web and through the perforations of the other apron 70 to cool the web and set it in its compressed state. The web is maintained in its compressed form upon cooling since the solidification of the low melt temperature binder fibers in their compressed state bonds the fibers together in that state.

Of course, it should be noted that both the processing technique itself as well as the processing line 10 would differ somewhat if, in place of the thermal bonding process described and illustrated herein, the resin bonding process previously described with respect to FIG. 6 was used in its place.

Returning momentarily to FIG. 10, the process of the present invention further comprises disposing a surface of the first web in a conforming relationship to a surface of the second web to form the bi-layer FR nonwoven fiber batt having first and second layers. Preferably, the first web of FR treated rayon and nonwoven fibers and the second web of the modacrylic PBX and nonwoven fibers are produced simultaneously, processed and wound together on a single roll. Alternately, the two webs may be produced separately and layered off line. By layering the first web of FR treated rayon and nonwoven fibers over the second web of the modacrylic PBX and nonwoven fibers, a bi-layer FR nonwoven fiber batt has been constructed in accordance with the teachings of the present invention.

As configured herein, the resultant bi-layer FR nonwoven fiber batt is comprised of a first, or oxygen depleting, layer and a second, or barrier, layer. When the bi-layer FR nonwoven fiber batt is placed over an article, for example, the oftentimes flammable interior components of a mattress, such that the oxygen-depleting layer is disposed against the article, and a flame is applied to the now covered article, the oxygen-depleting layer will begin to generate oxygen-depleting gases. Because the barrier layer formed using charring fibers will maintain its structural integrity, however, the oxygen-depleting gases generated by the oxygen depleting layer are trapped between the barrier layer and the article. As a result, a substantially oxygen free zone that will significantly reduce the rate of, and possibly entirely eliminate, the spread of flames into the article is produced.

Figure 11A:
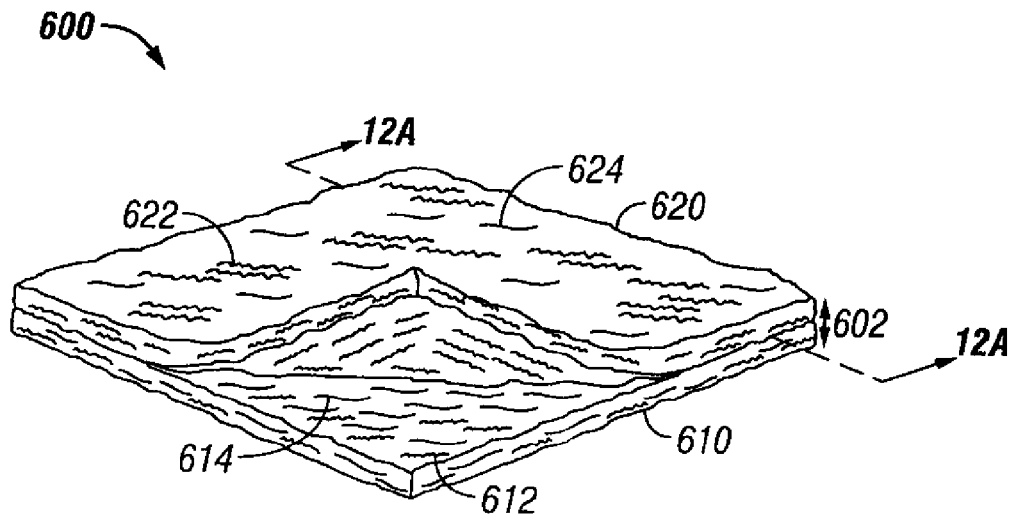
FIG. 11A is a perspective view of a first embodiment of a bi-layer FR nonwoven fiber batt formed in accordance with the method of FIG. 10 using the processing line of FIG. 2.
Figure 12A:
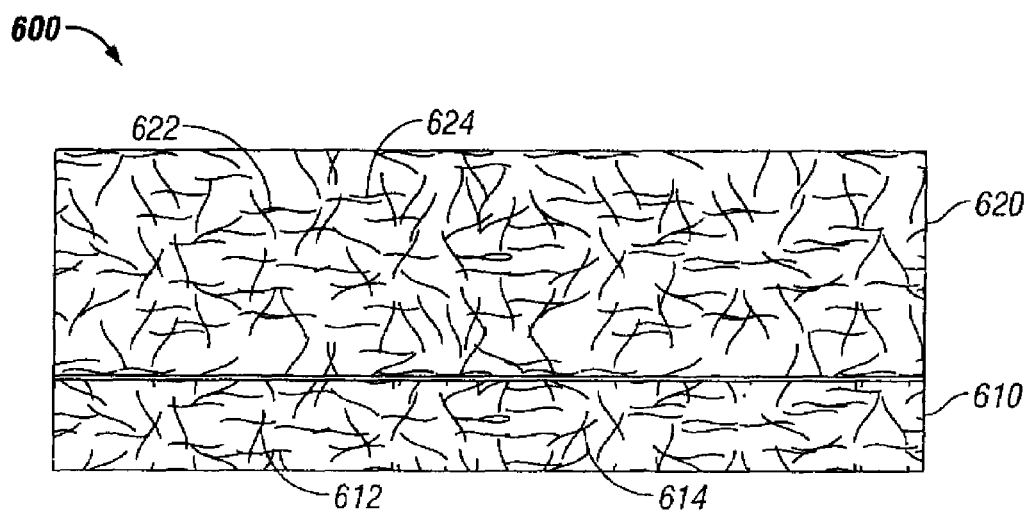
FIG. 12A is a cross-sectional view of the bi-layer FR nonwoven fiber batt of FIG. 11A taken along lines 12A—12A thereof.

Referring next to FIGS. 11A and 12A, a bi-layer FR nonwoven fiber batt 600 constructed in accordance with the method of FIG. 10 using the processing line of FIG. 2 will now be described in greater detail. As may now be seen, the bi-layer FR nonwoven batt 600 includes a first, oxygen depleting, layer 610 and a second, barrier, layer 620. The oxygen depleting layer 610 is comprised of a blend of nonwoven fibers 612 (preferably, a blend of carrier fibers and low melt binder fibers) and oxygen-depleting fibers 614 (preferably, PBX modacrylic fibers, another type of modacrylic fibers or other suitable types of oxygen-depleting fibers). The barrier layer 620 is comprised of a blend of nonwoven fibers 622 (again, preferably, a blend of carrier fibers and low melt binder fibers) and charring fibers 624 (preferably FR treated rayon, Visil®, FR treated cotton or other inherently FR fibers). The weight, density and thickness 602 of the bi-layer FR nonwoven fiber batt 600 is determined by, among other factors, the process of compressing the oxygen-depleting and barrier layers 610, 620 of the bi-layer FR nonwoven fiber batt 600 as they are cooled. For example, in one embodiment, it is contemplated that the bi-layer FR nonwoven fiber batt 600 may be a highloft batt.

As previously set forth, it was contemplated that one example of a bi-layer FR nonwoven fiber batt constructed in accordance with the teachings of the present invention would have an oxygen-depleting layer comprised of about forty-five percent, by volume, of PBX modacrylic fiber, about forty percent, by volume, of polyester fiber and about fifteen percent, by volume, of co-PET fiber and a barrier layer comprised of about seventy-five percent, by volume, of FR treated rayon fiber, about ten percent, by volume, of polyester fiber and about fifteen percent, by volume, of co-PET fiber. A bi-layer FR nonwoven fiber batt composed in accordance with the foregoing blends, would have a basis weight of 0.33 ounce per square foot for the oxygen-depleting layer, a basis weight of 0.66 ounce per square foot for the barrier layer, a basis weight of 1.0 ounce per square foot for the bi-layer FR nonwoven fiber batt itself and a total thickness of between ¾ and 1 inch, again, for the bi-layer FR nonwoven fiber batt itself.

Figure 13A:
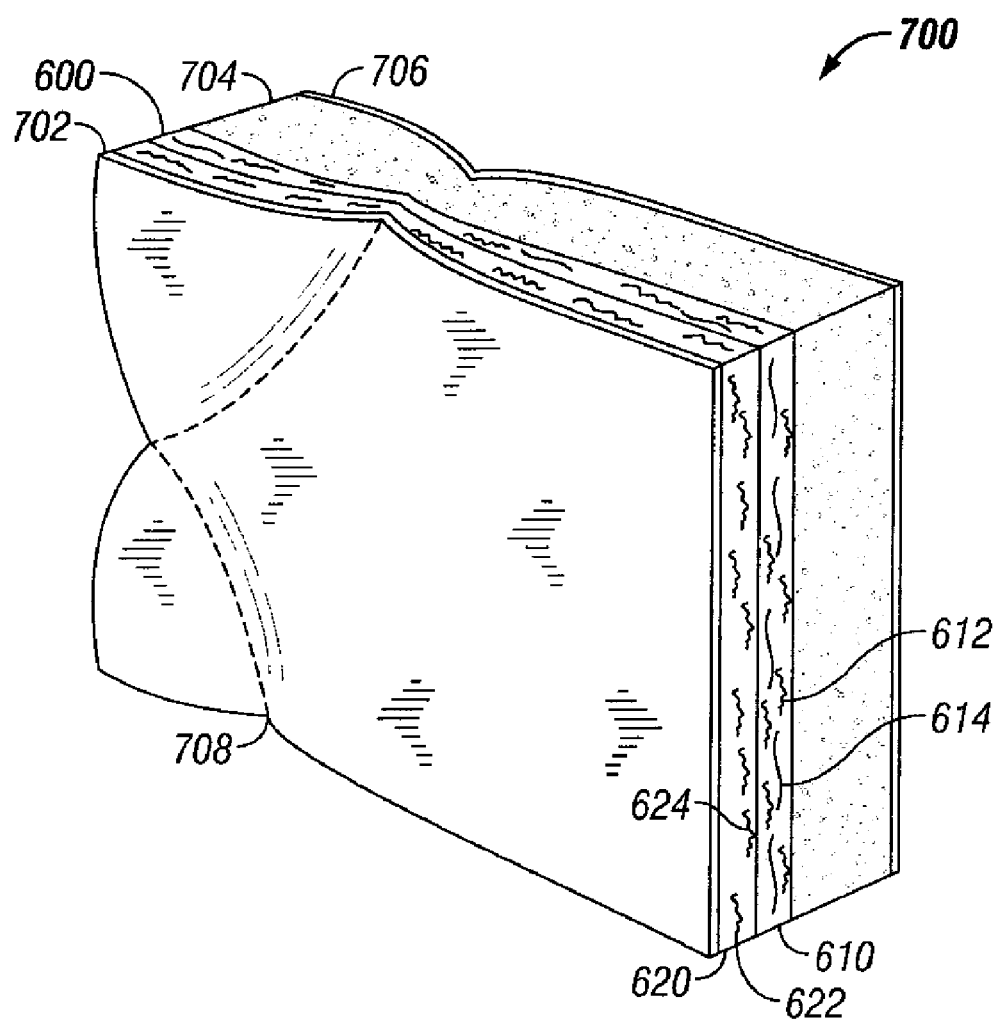
FIG. 13A is a side view of a mattress border incorporating the bi-layer FR nonwoven fiber batt of FIGS. 11A and 12A.

Referring next to FIG. 13A, a mattress border 700 configured to include the bi-layer FR nonwoven fiber batt 600 illustrated in FIGS. 11A and 12A will now be described in greater detail. As may now be seen, in addition to the bi-layer FR nonwoven fiber batt 600, the mattress border 700 further includes a ticking 702, a foam layer 704 and a quilt backing 706. As may now be seen, the bi-layer FR nonwoven fiber batt 600 has been positioned, relative to the other components of the mattress border 700 such that a surface of the barrier layer 620 thereof is disposed against the ticking 702 and a surface of the oxygen-depleting layer 610 is disposed against the foam layer 704. The ticking 702, the bi-layer FR nonwoven fiber batt 600, the foam layer 704 and the quilt backing 706 are stitched together and form quilt pattern 708. When arranged in this manner, the bi-layer FR nonwoven fiber batt 600 provides loft, comfort and resilience for the mattress border 700 while simultaneously enhancing the fire resistant characteristics of the mattress border 700. More specifically, in the event that the mattress border 700 is exposed to flame, the barrier layer 620 will begin to char while the oxygen-depleting layer 610 will begin to generate oxygen-depleting gases. Because the barrier layer 620 maintains its structural integrity during the charring process, the oxygen-depleting gases generated by the oxygen depleting layer 610 will be trapped between the barrier layer 620 and the foam layer 704. As a result, a substantially oxygen free zone that will slow or prevent the spread of flames into the foam layer is created.

Of course, it should be noted that the foregoing description of a bi-layer FR nonwoven fiber batt, specifically, the bi-layer FR nonwoven fiber batt 600, constructed in accordance with the teachings of the present invention and forming part of a mattress border, specifically, the mattress border 700, is purely by way of example. Accordingly, it is fully contemplated that a bi-layer FR nonwoven fiber batt 600 constructed in accordance with the teachings of the present invention may be used in a variety of other applications including, use within a mattress, a fire barrier layer, as filling in bedding, upholstery and vehicle and aircraft seats, as insulators for apparel, appliances, walls, vehicle walls and ducting, as barriers to separate control systems from a heat source, and as components in fire safety gear, and the like.

Figure 11B:
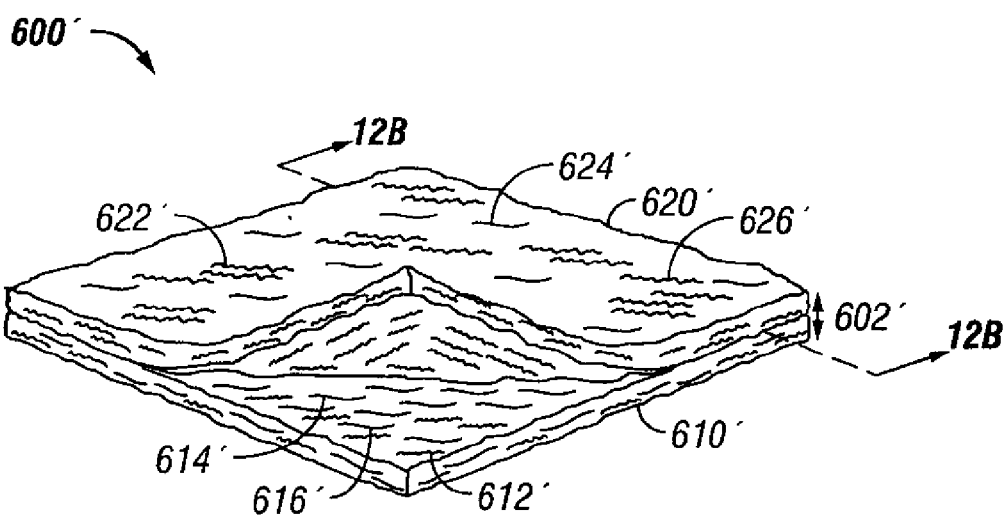
FIG. 11B is a perspective view of a second, alternate, embodiment of the bi-layer FR nonwoven fiber batt of FIG. 11A.
Figure 12B:
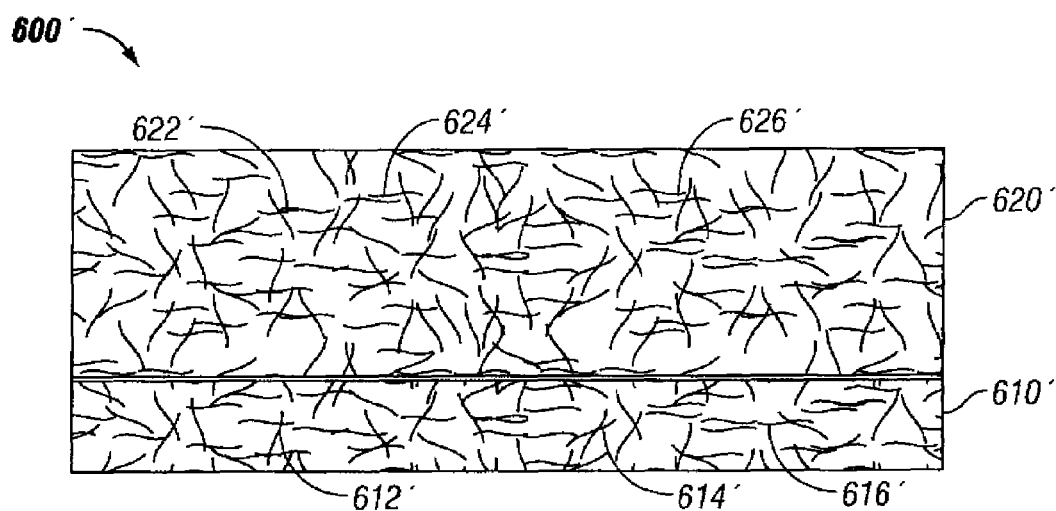
FIG. 12B is a cross-sectional view of the bi-layer FR nonwoven fiber batt of FIG. 11B taken along lines 12B—12B thereof.

In the foregoing embodiment of a bi-layer fire resistant nonwoven batt 600, inherently fire resistant fibers such as FR treated rayon were included only in the barrier layer 620 while oxygen-depleting fibers such as PBX modacrylic fibers were included only in the oxygen-depleting layer 610. Referring next to FIGS. 11B and 12B, an alternate embodiment of the bi-layer FR nonwoven fiber batt 600, more specifically, bi-layer FR nonwoven fiber batt 600' will now be described in greater detail. In this embodiment, it is contemplated that the blend of fibers forming the barrier layer 620' would also include oxygen-depleting fibers and the blend of fibers forming the oxygen-depleting layer 610' would also include charring fibers. More specifically, in this embodiment of the invention, it is contemplated that the layer 610' is comprised of a blend of FR treated cellulosic charring fibers 612', for example, FR treated rayon fibers, oxygen-depleting fibers 614' that release oxygen-depleting gases upon the application of flame or heat thereto, for example, PBX modacrylic fibers and nonwoven fibers 616'that provide comfort and aesthetics, for example, polyester fibers. Preferably, the layer 610' would contain a blend of charring fibers 612', oxygen-depleting fibers 614' and nonwoven fibers 616'selected such that the primary fibers of the layer 610' would be oxygen-depleting and polyester fibers 614' and 616' and that the percentage, by volume, of oxygen-depleting fibers 614 would exceed the percentage, by volume, of charring fibers 612'.

Conversely, the layer 620' would contain a similar blend of charring fibers 622', oxygen-depleting fibers 624'and nonwoven fibers 626', except that the percentage, by volume, of the charring fibers 622' would be significantly increased to ensure that the primary fibers of the layer 620' would be the FR treated rayon and polyester fibers 622' and 626' and that the percentage, by volume, of the FR treated rayon fibers 622' would exceed the percentage, by volume, of the PBX modacrylic fibers 624'.

When the layers 610', 620' of the bi-layer FR nonwoven fiber batt 600' are formed in accordance with the foregoing, the layer 620' would again serve primarily as a flame barrier layer. By inclusion of a small amount of the oxygen-depleting fibers 624' within the barrier layer 620', consumption of the barrier layer 620' by fire would be slowed, thereby maintaining the structural integrity of the barrier layer 620' for a longer period of time. The layer 610' would again serve as a comfort layer and as an insulating layer in the event of a fire. Again, as the PBX modacrylic fibers 614' in the layer 610' begin to melt, they would release oxygen-depleting gases which, as previously set forth, are trapped between the barrier layer 620' and interior combustible components of mattresses, furniture or the like, thereby slowing the progress of the fire. By inclusion of the FR treated rayon fibers 612' within the oxygen-depleting layer 610', the oxygen-depleting layer 610' would enjoy improved structural integrity, thereby delaying breakthrough of fire to the materials underlying the oxygen-depleting layer 610'.

Figure 13B:
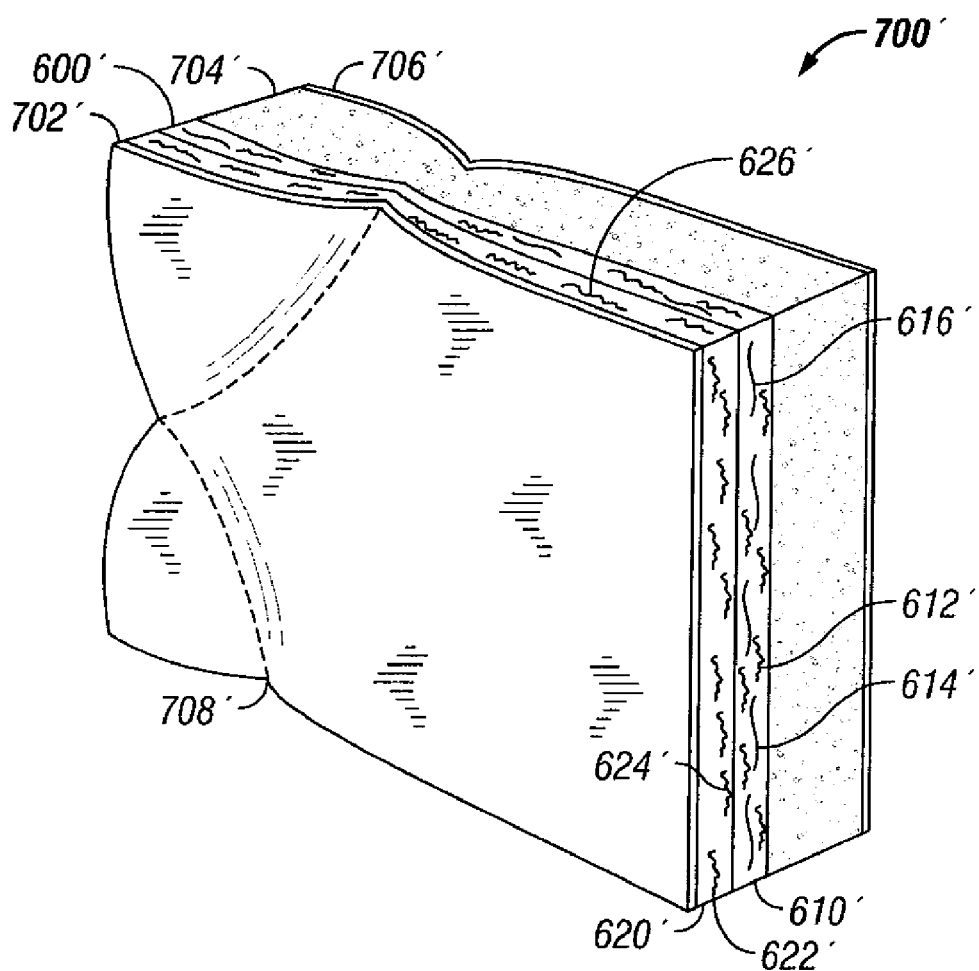
FIG. 13B is a side view of a mattress border incorporating the bi-layer FR nonwoven fiber batt of FIGS. 11B and 12B.

Referring next to FIG. 13B, a mattress border 700' configured to include the bi-layer FR nonwoven fiber batt 600' illustrated in FIGS. 11B and 12B will now be described in greater detail. As may now be seen, in addition to the bi-layer FR nonwoven fiber batt 600', the mattress border 700' further includes a ticking 702', a foam layer 704' and a quilt backing 706'. As may now be seen, the bi-layer FR nonwoven fiber batt 600' has been positioned, relative to the other components of the mattress border 700 such that a surface of the barrier layer 620' (which now includes oxygen-depleting fibers 624') is disposed against the ticking 702 and a surface of the oxygen-depleting layer 610' (which now includes charring fibers 612') is disposed against the foam layer 704. The ticking 702', the bi-layer FR nonwoven fiber batt 600', the foam layer 704' and the quilt backing 706' are stitched together and form quilt pattern 708'. When arranged in this manner, the bi-layer FR nonwoven fiber batt 600' provides loft, comfort and resilience for the mattress border 700' while simultaneously enhancing the fire resistant characteristics of the mattress border 700'. More specifically, in the event that the mattress border 700' is exposed to flame, the barrier layer 620' will begin to char while the oxygen-depleting layer 610' will begin to generate oxygen-depleting gases. Because the barrier layer 620' maintains its structural integrity during the charring process, the oxygen-depleting gases generated by the oxygen depleting layer 610' will be trapped between the barrier layer 620' and the foam layer 704'. As a result, a substantially oxygen free zone that will slow or prevent the spread of flames into the foam layer 704' is created. Further, the structural integrity of the barrier layer 620' will be maintained for a longer period because the inclusion of the oxygen-depleting fibers 624' to the barrier layer 620' will slow the charring of the barrier layer 620'. Finally, the possibility of a breakthrough of flame into the foam layer 704' is less likely because the inclusion of the charring fibers 612' to the oxygen-depleting layer 610' enhances the structural integrity of the oxygen-depleting layer 610'.

Of course, it should be noted that the foregoing description of a bi-layer FR nonwoven fiber batt, specifically, the bi-layer FR nonwoven fiber batt 600', constructed in accordance with the teachings of the present invention and forming part of a mattress border, specifically, the mattress border 700', is purely by way of example. Accordingly, it is fully contemplated that a bi-layer FR nonwoven fiber batt 600' constructed in accordance with the teachings of the present invention may be used in a variety of other applications including, use within a mattress, a fire barrier layer, as filling in bedding, upholstery and vehicle and aircraft seats, as insulators for apparel, appliances, walls, vehicle walls and ducting, as barriers to separate control systems from a heat source, and as components in fire safety gear, and the like.

Figure 14:
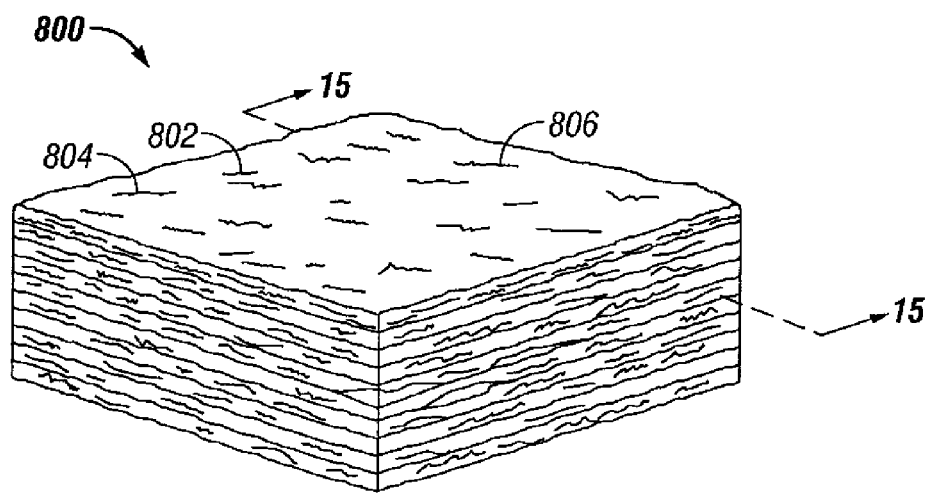
FIG. 14 is a perspective view of a uni-layer FR nonwoven fiber batt formed in accordance with the method of FIG. 10 using the processing line of FIG. 2.

Referring next to FIG. 14, still another alternate embodiment of a FR nonwoven fiber batt constructed in accordance with the teachings of the present invention will now be described in greater detail. In this embodiment, the FR nonwoven fiber batt is configured as a uni-layer FR nonwoven fiber batt 800 comprised of a blend of charring fibers 802, oxygen depleting fibers 804 and nonwoven 806. It is contemplated that the uni-layer FR nonwoven fiber batt 800 may be formed using that portion of the method illustrated in FIG. 10 used to form the first fiber blend, except, that, in this embodiment, the first fiber blend would instead be a blend of charring fibers, oxygen depleting fibers and nonwoven fibers.

In various embodiments of the uni-layer FR nonwoven fiber batt 800, it is contemplated that the charring fibers 802 may be a fire resistant treated cellulosic charring fibers such as FR treated rayon fibers and the oxygen depleting fibers 804 may be Protex® modacrylic fibers manufactured by Kankeka Corporation of Osaka, Japan, other modacrylic fibers or other suitable oxygen depleting fibers. It is further contemplated that the nonwoven fibers 806 may be comprised entirely of carrier fibers, comprised entirely of binder fibers or comprised of a blend of carrier fibers and binder fibers. Of the foregoing, however, it is preferred that the nonwoven fibers 806 be comprised entirely of binder fibers. In a preferred embodiment thereof, the uni-layer FR nonwoven fiber batt 800 is comprised of about sixty percent, by volume, of FR treated rayon fibers 802, about twenty percent, by volume, of modacrylic fibers 804 such as the aforementioned Protex® modacrylic fibers and about twenty percent, by volume, of a low-melt binder fiber 806. When formed in accordance with the foregoing, the uni-layer FR nonwoven fiber batt 800 would have a basis weight of about ¾ oz. per sq. ft.

Of course, as this, the preferred embodiment of the uni-layer FR nonwoven fiber batt 800 includes low melt binder fibers, the aforedescribed thermal bonding processing would be better suited for use during the formation thereof. In this regard, while it is fully contemplated that the aforedescribed resin bonding processes may instead be used during the formation process, the resultant uni-layer FR nonwoven batt formed using resin bonding processes would tend to be less fire resistant than those formed using thermal bonding processes.

It should also be fully understood that the disclosure of a preferred embodiment of the uni-layer FR nonwoven batt 800 as being comprised of about sixty percent, by volume, of the charring fibers 802, about twenty percent, by volume, of the oxygen-depleting fibers 804 and about twenty percent, by volume, of the binder fibers 806 should not be interpreted as suggesting that no other compositions of the charring and oxygen-depleting fibers would prove suitable for the purposes contemplated herein. Rather, it should be clearly understood that a wide variety of compositions are also suitable.

More specifically, broadly speaking, it has been discovered that, to adequately delay breakthrough of the charring fibers 802, the fiber blend must be a minimum of about ten percent, by volume, of the modacrylic fibers 804. It has been further discovered that, to maintain the desired structural integrity of the uni-layer FR nonwoven fiber batt 800, the fiber blend must be a minimum of about fifty percent, by volume, of the charring fiber 802. Thus, the percentage, by volume, of either the charring fibers 802 or the oxygen-depleting fibers 804 may be increased by a corresponding reduction in the percentage, by volume, of the binder fibers 806. For example, it is contemplated that the binder fibers 806 may be reduced to at least about twelve percent, by volume, of the fiber blend. Further, the percentage, by volume, of the oxygen-depleting fibers 804 may also be increased by a corresponding reduction in the percentage, by volume, of the charring fibers 802 from the aforementioned about sixty percent, by volume, to a desired volume at or above the minimum of about fifty percent, by volume, of the fiber blend while the percent, by volume, of the charring fibers 802 may also be increased by a corresponding reduction in the percent, by volume, of the oxygen-depleting fibers 804 from the aforementioned about twenty percent, by volume, to a desired volume at or above the minimum of about ten percent, by volume, of the fiber blend. Thus, the fiber blend from which the uni-layer FR nonwoven fiber batt 800 may be comprised of between about fifty and about seventy-eight percent, by volume of the charring fibers 802, between about ten percent and about thirty-eight percent, by volume, of the oxygen-depleting fibers 804 and between about twelve percent and about forty percent, by volume, of the binder fibers 806.

While further variations of the percentages by volume of the charring fibers 802, the oxygen-depleting fibers 804 and the nonwoven fibers 806 beyond those specifically hereinabove recited are also contemplated, any such further variations should be made in conjunction with a modification of the basis weight of the uni-layer FR nonwoven fiber batt 800. For example, the aforedescribed fiber blend comprised of about sixty percent, by volume, of the charring fibers 802, about twenty percent, by volume, of the oxygen-depleting fibers 804 and about twenty percent, by volume of the binder fibers 806 has a basis weight of 0.75 ounces per square foot which, in turn, can be broken down into component basis weights of 0.45 ounces per square foot of the charring fibers 802, 0.15 ounces per square foot of the oxygen-depleting fibers 804 and 0.15 ounces per square foot of the binder fibers 806. If the component basis of the oxygen-depleting fibers 804 were then increased to 0.40 ounces per square foot, the resultant uni-layer FR nonwoven fiber batt 800 would have basis of 1.0 ounces per square foot comprised of a fiber blend of about forty-five percent, by volume of the charring fibers 802, about forty percent, by volume, of the oxygen-depleting fibers 804 and about fifteen percent, by volume, of the binder fibers 806. Thus, while it is possible to further modify the composition of the blend of the charring, oxygen-depleting and nonwoven fibers 802, 804 and 806, such modifications should be accompanied by a modification in the basis of the uni-layer FR nonwoven fiber batt 800. In the example hereinabove described, while the percentage, by volume, of the oxygen-depleting fibers 804 were increased above the about ten percent to about thirty-eight percent, by volume, range previously described, such an increase was achieved by densifying the uni-layer FR nonwoven fiber batt 800 beyond that originally contemplated.

By configuring a uni-layer FR nonwoven fiber batt 800 in the manner described herein, an FR nonwoven fiber batt characterized by enhanced fire resistance performance, once-for-ounce, when compared to many existing fire resistant batt products, is produced. Further, because the disclosed uni-layer FR nonwoven batt 800 can achieve similar fire resistance performance as existing fire resistant batts while remaining lighter, the disclosed uni-layer FR nonwoven batt may be used to reduce manufacturing costs. More specifically, FR rayon is a fiber which chars when exposed to flame and also tends to self-extinguish. By robbing oxygen from the flame, the modacrylic fibers will tend to reduce the heat produced by the flam, slow the conversion of the FR rayon fibers into char and enhance the ability of the FR rayon fibers to self-extinguish As a result, the breakthrough of fire through the uni-layer FR nonwoven batt is slowed.

Figure 15:
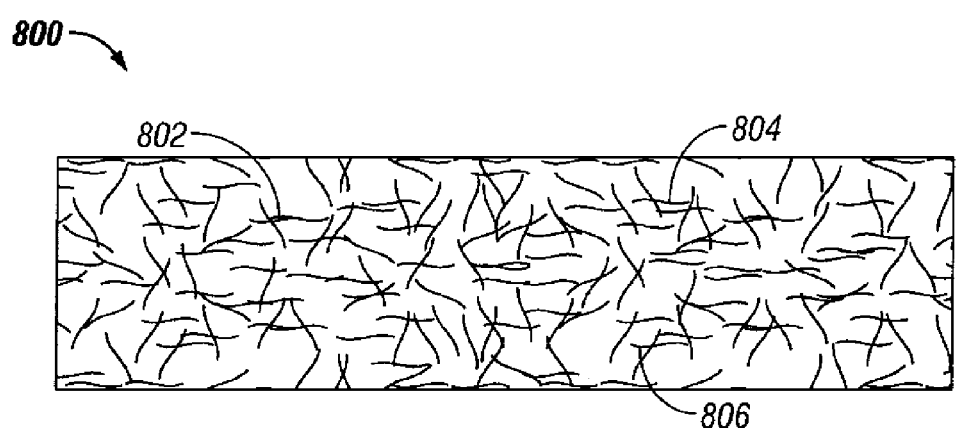
FIG. 15 is a cross-sectional view of the uni-layer FR nonwoven fiber batt of FIG. 14 taken along lines 15—15 thereof.
Figure 16:
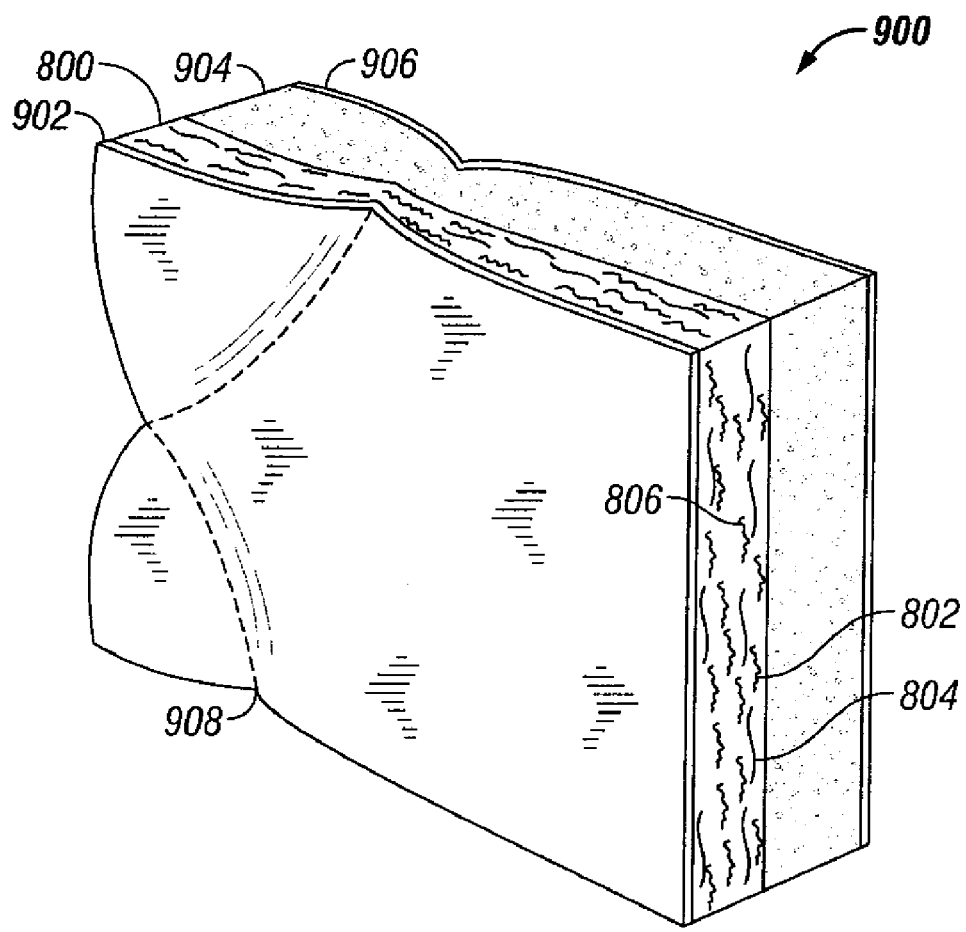
FIG. 16 is a mattress border incorporating the uni-layer FR nonwoven fiber batt of FIGS. 14 and 15.

Referring next to FIG. 16, a mattress border 900 configured to include the uni-layer FR nonwoven fiber batt 800 illustrated in FIGS. 14 and 15 will now be described in greater detail. As may now be seen, in addition to the uni-layer FR nonwoven fiber batt 800, the mattress border 900 further includes a ticking 902, a foam layer 904 and a quilt backing 906'. As may now be seen, the uni-layer FR nonwoven fiber batt 800 has been positioned between the ticking 902 and the foam layer 904. The ticking 902, the uni-layer FR nonwoven fiber batt 800, the foam layer 904 and the quilt backing 906 are stitched together and form quilt pattern 908. When arranged in this manner, the uni-layer FR nonwoven fiber batt 800 provides loft, comfort and resilience for the mattress border 900 while simultaneously enhancing the fire resistant characteristics of the mattress border 900. More specifically, in the event that the mattress border 900 is exposed to flame, the charring fibers 802 will begin to char while the oxygen-depleting fibers 804 will begin to generate oxygen-depleting gases. The charring fibers 802 will maintain the structural integrity of the uni-layer FR nonwoven fiber batt 800 while the oxygen-depleting gases generated by the oxygen depleting fibers 804 will slow the charring of the uni-layer FR nonwoven fiber batt 800.

Of course, it should be noted that the foregoing description of a uni-layer FR nonwoven fiber batt, specifically, the uni-layer FR nonwoven fiber batt 800, constructed in accordance with the teachings of the present invention and forming part of a mattress border, specifically, the mattress border 900, is purely by way of example. Accordingly, it is fully contemplated that a uni-layer FR nonwoven fiber batt 800 constructed in accordance with the teachings of the present invention may be used in a variety of other applications including, use within a mattress, a fire barrier layer, as filling in bedding, upholstery and vehicle and aircraft seats, as insulators for apparel, appliances, walls, vehicle walls and ducting, as barriers to separate control systems from a heat source, and as components in fire safety gear, and the like.

While a number of preferred embodiments of the invention has been shown and described herein, modifications thereof may be made by one skilled in the art without departing from the spirit and the teachings of the invention. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalence of the subject matter of the claims.

What is claimed is:

1. A method of forming a bi-layered, fire resistant ("FR") nonwoven fiber batt, comprising:
   forming a first nonwoven fiber batt from a first fiber blend consisting of charring fibers polyester carrier fibers and polyester binder fibers;
   forming a second nonwoven fiber batt from a second fiber blend consisting of oxygen-depleting fibers polyester carrier fibers and polyester binder fibers;
   disposing said first and second nonwoven fiber batts relative to one another such that said second nonwoven fiber batt forms an inner layer of said bi-layered FR nonwoven fiber batt and said first nonwoven fiber batt forms an outer layer of said bi-layered FR nonwoven fiber batt;
   wherein, upon application of flame andlor heat to said bi-layered FR nonwoven fiber batt, said inner layer of said bi-layered FR nonwoven fiber batt generates oxygen depleting gases while said outer layer of said bi-layered FR nonwoven fiber batt chars but maintains sufficient structural integrity to trap said oxygen depleting gases, generated by said inner layer of said bi-layer FR nanwoven fiber batt, between said inner and outer layers of said bi-layered FR nonwoven fiber ban.

2. The method of claim 1, wherein said first fiber blend is between about five and about ninety-five percent, by volume, charring fibers.

3. The method of claim 1, wherein said first fiber blend is about seventy-five percent, by volume, charring fibers, about ten percent, by volume, polyester carrier fibers and about fifteen percent, by volume, polyester binder fibers.

4. The method of claim 1, wherein said charring fibers are FR treated rayon fibers.

5. The method of claim 1, wherein said second fiber blend is between about five and about ninety five percent, by volume, oxygen-depleting fibers.

6. The method of claim 1, wherein said second fiber blend is about forty-five percent, by volume, oxygen-depleting fibers, about forty percent, by volume, polyester carrier fibers and about fifteen percent, by volume, polyester binder fibers.

7. The method of claim 6, wherein said oxygen-depleting fibers are modacrylic fibers.

8. The method of claim 1, wherein said first fiber blend is between five and ninety-five percent, by volume, charring fibers and wherein said second fiber batt is between five and ninety-five percent, by volume, oxygen-depleting fibers.

9. The method of claim 1, wherein said first fiber blend is about seventy-five percent, by volume, charring fibers, about ten percent, by volume, polyester carrier fibers and about fifteen percent, by volume, polyester binder fibers and wherein said second fiber blend is a blend of about forty-five percent, by volume, oxygen-depleting fibers, about forty percent, by volume, polyester carrier fibers and about fifteen percent, by volume, polyester binder fibers.

10. The method of claim 9, wherein said charring fibers of said first fiber blend are FR treated rayon fibers and wherein said oxygen-depleting fibers of said second fiber blend are modacrylic fibers.

11. A bi-layered, fire resistant ("FR") nonwoven fiber batt, comprising:
    a first nonwoven fiber batt having a first surface, said first nonwoven fiber batt formed from a first fiber blend consisting of charring fibers, polyester carrier fibers and polyester binder fibers; and
    a second nonwoven fiber batt having a second surface, said second nonwoven fiber batt formed from a second fiber blend consisting of oxygen-depleting fibers, polyester carrier fibers and polyester binder fibers, said first surface of said first nonwoven fiber batt in contact with and oriented relative to said second surface of said second nonwoven fiber batt such that said first nonwoven fiber batt forms an outer layer of said bi-layered FR nonwoven fiber batt and said second nonwoven fiber batt forms an inner layer of said bi-layered FR nonwoven fiber batt;
    wherein, upon application of flame and/or heat to said bi-layered FR nonwoven fiber batt, said inner layer of said bi-layered FR nonwoven fiber batt generates oxygen-depleting gases while said outer layer of said bi-layered FR nonwoven fiber bait chars but maintains sufficient structural integrity to trap said oxygen depleting gases, generated by said inner layer of said bi-layer FR nonwoven fiber ban, between said inner and outer layers of said bi-layered FR nonwoven fiber batt.

12. The bi-layered FR nonwoven fiber batt of claim 11, wherein said first fiber blend is between about five and about ninety-five percent, by volume, of charring fibers.

13. The bi-layered FR nonwoven tiber ban of claim 11, wherein said first fiber blend is a blend of about seventy-five percent, by volume, charring fibers, about ten percent, by volume, polyester carrier fibers and fifteen percent, by volume, polyester binder fibers.

14. The bi-layered FR nonwoven fiber batt of claim 13, wherein said charring fibers are FR treated rayon fibers.

15. The bi-layered FR nonwoven fiber batt of claim 11, wherein said second fiber blend is between about five and about ninety five percent, by volume, of oxygen-depleting fibers.

16. The bi-layered FR nonwoven fiber batt of claim 11, wherein said second fiber blend is a blend of about forty-five percent, by volume, oxygen-depleting fibers, about forty percent, by volume, polyester carrier fibers and about fifteen percent, by volume, polyester binder fibers.

17. The bi-layered FR nonwoven fiber batt of claim 16, wherein said oxygen-depleting fibers are modacrylic fibers.

18. The bi-layered FR nonwoven fiber batt of claim 11, wherein said first fiber blend is between about five and about ninety-five percent, by volume, charring fibers and wherein said second fiber batt is between about five and about ninety five percent, by volume, oxygen-depleting fibers.

19. The bi-layered FR nonwoven fiber bail of claim 11, wherein said first fiber blend is a blend of about seventy-five percent, by volume, charring fibers, about ten percent, by volume, polyester carrier fibers and about fifteen percent, by volume, polyester binder fibers and wherein said second fiber blend is a blend of about forty-five percent, by volume, oxygen-depleting fibers, about forty percent, by volume, polyester carrier fibers and about fifteen percent, by volume, polyester binder fibers.

20. The bi-layered FR nonwoven fiber bait of claim 19, wherein said charring fibers of said first fiber blend are FR treated rayon fibers and wherein said oxygen-depleting fibers of said second fiber blend are modacrylic fibers.

21. A method for forming a bi-layered fire resistant ("FR") nonwoven fiber batt comprising:
    forming a first web from a blend consisting of modacrylic fibers polyester carrier fibers and polyester binder fibers, said first web having first and second side surfaces;
    forming a second web from a blend consisting of FR rayon fibers polyester carrier fibers and polyester binder fibers, said second web having first and second side surfaces;
    disposing said first side surface of said second web to said second side surface of said first web; and
    forming a bi-layered FR nonwoven fiber batt from said disposed webs, said first side surface of said first web becoming a lower side surface of said bi-layered FR nonwoven fiber batt, said first web becoming an inner layer of said bi-layered FR nonwoven fiber batt, said second web becoming an outer layer of said bi-layered FR nonwoven fiber batt and said second side surface of said second web becoming an upper side surface of said bi-layered FR nonwoven fiber batt;
    wherein, upon application of flame and/or heat to said upper side surface of said bi-layered FR nonwoven fiber batt, said inner layer of said bi-layered FR nonwoven fiber batt generates oxygen depleting gases while said outer layer of said bi-layered FR nonwoven fiber batt chars but maintains sufficient structural integrity to trap said oxygen depleting gases, generated by said inner layer of said bi-layer FR nonwoven fiber batt, between said inner and outer layers of said bi-layered FR nonwoven fiber batt.

22. The method of claim 21, wherein said blend of modacrylic fibers and polyester carrier fibers is between about five and about ninety five percent, by volume, modacrylic fibers.

23. The method of claim 21, wherein said blend of FR rayon fibers and polyester carrier fibers is between about five and about ninety five percent, by volume, FR rayon fibers.

24. The method of claim 21, wherein said blend of modacrylic fibers and polyester carrier fibers is between about five and about ninety five percent, by volume, modacrylic fibers and wherein said blend of FR rayon fibers and polyester cater fibers is between about five and about ninety five percent, by volume, FR rayon fibers.

25. The method of claim 21, further comprises polyester binder fibers, wherein said bi-layered FR nonwoven fiber batt is formed by melting said polyester binder fibers while applying a compressive force to said disposed webs.

\* \* \* \* \*

UNITED STATES PATENT AND TRADEMARK OFFICE
CERTIFICATE OF CORRECTION

| | |
|---|---|
| PATENT NO. | : 7,125,460 B2 |
| APPLICATION NO. | : 10/968339 |
| DATED | : October 24, 2006 |
| INVENTOR(S) | : Steven E. Ogle et al. |

Page 1 of 1

It is certified that error appears in the above-identified patent and that said Letters Patent is hereby corrected as shown below:

Col. 15, line 56, replace "gametts" with -- garnetts --.

Col. 18, line 39, "foot. The" should not be italicized.

Col. 25, line 20, replace "616'selected" with -- 616' selected --.

Col. 25, line 26, replace "624'and" with -- 624' and --.

In Claim 1, Col. 29, line 39, replace "relative to onc" with -- relative to one --.

In Claim 1, Col. 29, line 44, replace "andlor" with -- and/or --.

In Claim 1, Col. 29, line 52, replace "fiber ban" with -- fiber batt --.

In Claim 11, Col. 30, line 44, replace "fiber bait" with -- fiber batt --.

In Claim 11, Col. 30, line 47, replace "fiber ban" with -- fiber batt --.

In Claim 13, Col. 30, line 52, replace "tiber ban" with -- fiber batt --.

In Claim 19, Col. 31, line 8, replace "fiber bail" with -- fiber batt --.

In Claim 20, Col. 31, line 17, replace "fiber bait" with -- fiber batt --.

In Claim 24, Col. 32, line 28, replace "cater" with -- carrier --.

Signed and Sealed this

Second Day of September, 2008

JON W. DUDAS
*Director of the United States Patent and Trademark Office*